US010614303B2

(12) United States Patent
Klingström et al.

(10) Patent No.: US 10,614,303 B2
(45) Date of Patent: *Apr. 7, 2020

(54) RELIABILITY OF GAZE TRACKING DATA FOR LEFT AND RIGHT EYE

(71) Applicant: Tobii AB, Danderyd (SE)

(72) Inventors: Andreas Klingström, Danderyd (SE); Mattias Kuldkepp, Danderyd (SE); Mårten Skogö, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,865

(22) Filed: Apr. 3, 2018

(65) Prior Publication Data

US 2019/0108383 A1    Apr. 11, 2019

Related U.S. Application Data

(63) Continuation of application No. 15/700,878, filed on Sep. 11, 2017, now Pat. No. 9,940,518.

(51) Int. Cl.
*G06K 9/00* (2006.01)
*G06K 9/20* (2006.01)
(Continued)

(52) U.S. Cl.
CPC .......... *G06K 9/0061* (2013.01); *G06K 9/2054* (2013.01); *G06T 7/13* (2017.01);
(Continued)

(58) Field of Classification Search
CPC ............. G06K 9/0061; G06K 9/00597; G06K 9/2054; G06T 7/74; G06T 7/13; G06T 7/60; G06F 3/013
See application file for complete search history.

(56) References Cited

U.S. PATENT DOCUMENTS 9,323,325 B2   4/2016   Perez et al.
9,454,225 B2   9/2016   Bychkov et al.
(Continued)

FOREIGN PATENT DOCUMENTS

WO      2016/074861 A1      5/2016

OTHER PUBLICATIONS

International Search Report and Written Opinion for PCT/US2017/050949 dated Jun. 4, 2018, all pages.

*Primary Examiner* — Phuoc Tran
(74) *Attorney, Agent, or Firm* — Samuel I. Yamron

(57) ABSTRACT

Circuitry of a gaze/eye tracking system obtains one or more images of a left eye and one or more images a right eye, determines a gaze direction of the left eye based on at least one obtained image of the left eye, determines a gaze direction of the right eye based on at least one obtained image of the right eye, determines a first confidence value based on the one or more obtained images of the left eye, determines a second confidence value based on the one or more obtained images of the right eye, and determines a final gaze direction based at least in part on the first confidence value and the second confidence value. The first and second confidence values represent indications of the reliability of the determined gaze directions of the left eye and the right eye, respectively. Corresponding methods and computer-readable media are also provided.

20 Claims, 11 Drawing Sheets

(51) Int. Cl.
*G06T 7/13* (2017.01)
*G06T 7/73* (2017.01)
*G06T 7/60* (2017.01)

(52) U.S. Cl.
CPC ............... *G06T 7/60* (2013.01); *G06T 7/74* (2017.01); *G06T 2207/30201* (2013.01)

(56) References Cited

U.S. PATENT DOCUMENTS

| | | | |
|---|---|---|---|
| 9,940,518 B1* | 4/2018 | Klingstrom | G06K 9/0061 |
| 2010/0328444 A1 | 12/2010 | Blixt et al. | |
| 2012/0050682 A1* | 3/2012 | Bonnin | A61B 3/113 |
| | | | 351/210 |
| 2012/0189160 A1 | 7/2012 | Kaneda et al. | |
| 2013/0107207 A1 | 5/2013 | Zhao et al. | |
| 2014/0362446 A1 | 12/2014 | Bickerstaff et al. | |
| 2016/0004303 A1 | 1/2016 | Arar et al. | |

* cited by examiner

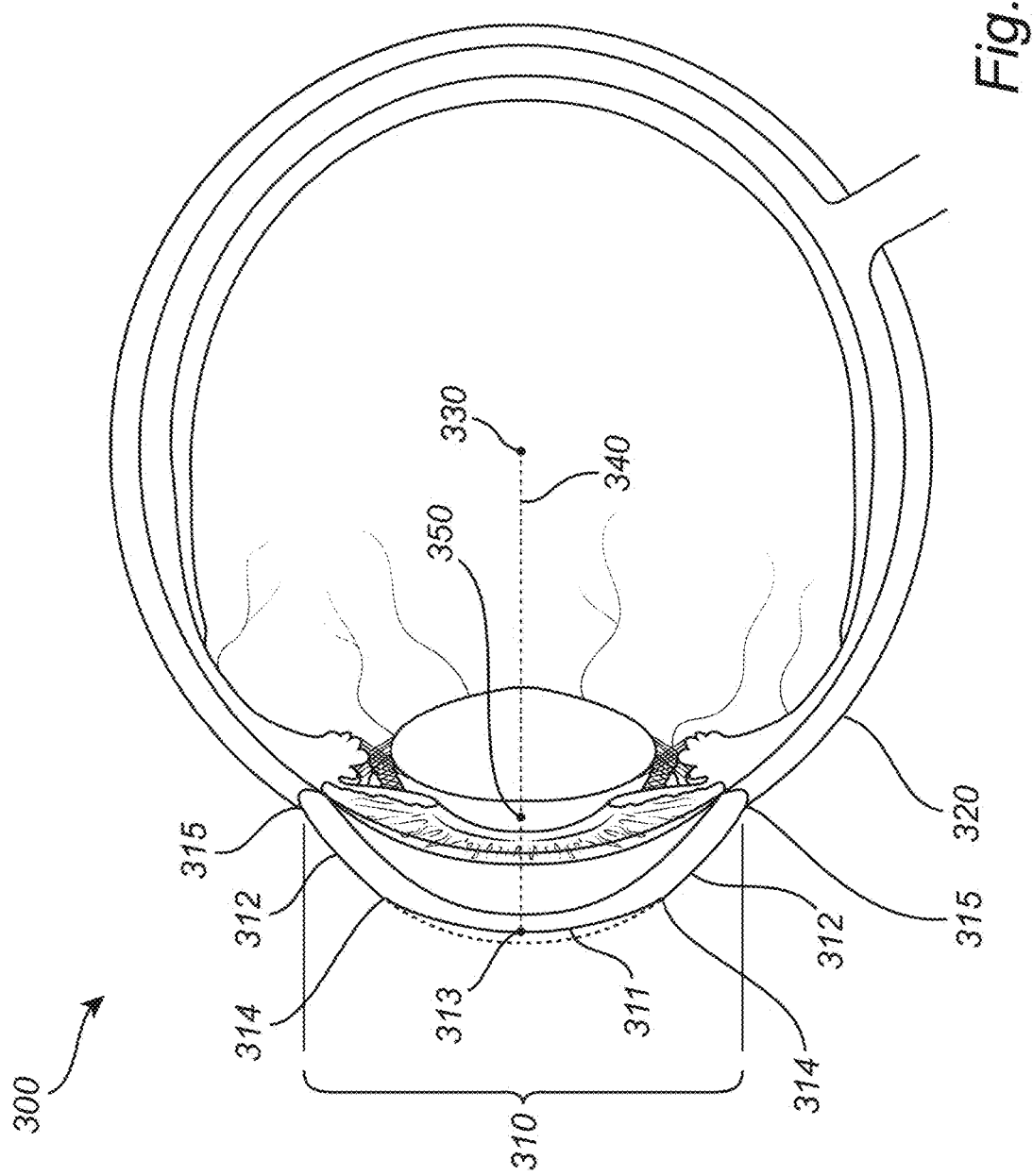

RELIABILITY OF GAZE TRACKING DATA FOR LEFT AND RIGHT EYE

CROSS-REFERENCE TO RELATED APPLICATIONS

This application is a continuation of U.S. Non-Provisional patent application Ser. No. 15/700,878, filed Sep. 11, 2017. The above-identified patent application is hereby incorporated by reference herein in its entirety for all purposes.

BACKGROUND OF THE INVENTION

The present disclosure generally relates to the field of eye tracking. In particular, the present disclosure relates to systems and methods for generating and/or using gaze tracking data indicating a gaze direction of an eye.

Several different eye tracking systems are known in the art. Such systems may for example be employed to allow a user to indicate a location at a computer display by looking at that point. The eye tracking system may capture images of the user's face, and then employ image processing to extract key features from the user's face, such as a pupil center and glints from illuminators illuminating the user's face. The extracted features may then be employed to determine where at the display the user is looking. Naturally, factors such as accuracy, speed, and reliability/robustness of the eye tracking are desirable to achieve a positive user experience. Therefore, several schemes have been proposed for mitigating the negative effects of different types of errors or inaccuracies that may occur in eye tracking systems.

For example, US 2010/0328444 A1 (which is incorporated by reference herein in its entirety) discloses an eye tracker which includes at least one illuminator for illuminating an eye, at least two cameras for imaging the eye, and a controller. The configuration of the illuminator(s) and cameras is such that, at least one camera is coaxial with a reference illuminator and at least one camera is non-coaxial with a reference illuminator. The controller is adapted to select one of the cameras to be active to maximize an image quality metric and to avoid obscuring objects. The eye tracker is operable in a dual-camera mode to improve accuracy. A method and computer-program product for selecting a combination of an active reference illuminator from a number of reference illuminators, and an active camera from a plurality of cameras are also disclosed.

As another example, US 2014/0362446 A1 (which is incorporated by reference herein in its entirety) discloses a head mountable display (HMD) system. The HMD system comprises an eye position detector comprising one or more cameras configured to detect the position of each of the HMD user's eyes, a dominant eye detector configured to detect a dominant eye of the HMD user, and an image generator configured to generate images for display by the HMD in dependence upon the HMD user's eye positions. The image generator is configured to apply a greater weight to the detected position of the dominant eye than to the detected position of the non-dominant eye. The dominant eye is detected by one or more of the following: (i) the eye with the wider range of movement, (ii) the eye which reaches a gaze direction appropriate to a displayed stimulus the closest and/or the most quickly, (iii) the eye which holds a position relating to a displayed stimulus.

As a further example, US 2016/0004303 A1 (which is incorporated by reference herein in its entirety) discloses an eye gaze tracking system which includes a gaze data acquisition system including a plurality of light sources and a plurality of image sensors. The light sources are arranged to emit light to a head of the user, and the image sensors are configured to receive the light. In an embodiment, the system further includes a gaze tracking module including an ocular feature extraction module, a point of regard (POR) calculation module and a POR averaging module. The ocular feature extraction module is configured to process the gaze data and to extract ocular features in relation to each image sensor, and is configured to determine a confidence value associated with an accuracy of the parameters for each image sensor. The confidence value may for example depend on head pose angle (in yaw, pitch and roll angle), user distance and feature detection reliability. The POR calculation module is configured to determine a POR from the ocular features for each image sensor. The POR averaging module is configured to determine an average POR using the confidence values of the POR for the respective image sensors.

However, it would be desirable to provide further systems and methods addressing at least one of the issues described above.

BRIEF SUMMARY OF THE INVENTION

An object of the present disclosure is to address at least one of the issues described above.

According to a first aspect, there is provided an eye tracking system comprising a circuitry. The eye tracking system may also be referred to as a gaze tracking system. The circuitry is configured to obtain one or more images of a left eye of a user and one or more images of right eye of the user, determine (or compute) a gaze direction of the left eye of the user based on at least one obtained image of the left eye, and determine (or compute) a gaze direction of the right eye of the user based on at least one obtained image of the right eye. The circuitry is configured to determine (or compute) a first confidence value based on the one or more obtained images of the left eye. The first confidence value represents an indication of the reliability of the determined gaze direction of the left eye. The circuitry is configured to determine (or compute) a second confidence value based on the one or more obtained images of the right eye. The second confidence value represents an indication of the reliability of the determined gaze direction of the right eye. The circuitry is configured to determine (or compute) a final gaze direction based at least in part on the first confidence value and the second confidence value. The final gaze direction may also be referred to as a combined gaze direction.

Since the left and right eyes are located at different positions, optical effects caused by glasses or obscuring elements such as eye lashes or the nose may have different impact on the gaze directions determined for the left and right eyes, even if the same image is employed for the gaze tracking of both eyes. The different positioning of the two eyes typically also causes the eyes to be directed in slightly differently directions when a user focuses at a certain point on for example a computer screen. The different positions and/or orientations of the left and right eye may for example cause glints from illuminators to be located at different parts of the two eyes. Since different parts of the eyes have different shape, this may cause gaze directions determined based on the glints to be of different quality/accuracy for the left and right eye. Optical properties of the left and right eyes themselves may also be different. For example, the shape of cornea may differ between the eyes. The offset between the optical center of the eye and the position of the fovea may also differ between the left and right eye. While the differences may be relatively small, such differences may cause the gaze direction determined for one of the eyes to be less reliable than the gaze direction determined for the other eye.

As described above, several different factors may potentially cause the determined gaze direction of one of the eyes to me more reliable than the determined gaze direction of the other eye. If a final gaze direction (or a gaze point) is computed via a simple average of the determined gaze directions for the left and right eyes, a temporary error in the determined gaze direction of one eye may cause large errors in the resulting final (or combined) gaze direction, even if the determined gaze direction of the other eye is very reliable for that period of time. Determining confidence values for the left and right eyes, and determining a final (or combined) gaze direction based on the confidence values allows such factors to be taken into account for providing a more accurate final (or combined) gaze direction for the user. For example, if the determined gaze direction for one eye is determined to be unreliable, this gaze direction may be provided lower weight than the gaze direction determined for the other eye.

The left and right eyes may for example be illuminated by one or more illuminators, which may for example be light sources such as light emitting diodes.

The images of the left eye and the right eye may for example have been captured by one or more image sensors, such as one or more cameras.

The determined gaze direction of the left eye may for example define an estimated gaze point of the left eye. Similarly, the determined gaze direction of the right eye may for example define an estimated gaze point of the right eye.

It will be appreciated that the reliability of the determined gaze direction for the left eye may for example be indicated via a positive scale where high confidence values indicate high reliability/confidence, or via a negative (or inverted) scale where high confidence values indicate low reliability/ confidence. In other words, a high confidence value may be employed to indicate high reliability or may be employed to indicate high uncertainty/unreliability. Similarly, it will be appreciated that the reliability of the determined gaze direction for the right eye may for example be indicated via a positive scale where high confidence values indicate high reliability/confidence, or via a negative (or inverted) scale where high confidence values indicate low reliability/confidence.

The first confidence value may for example be determined (or computed) based on one or more parameters representing respective factors indicative of (or affecting) a reliability of the gaze direction determined for the left eye. The one or more parameters may for example be computed (or determined) based on the one or more obtained images of the left eye. The first confidence value may for example be referred to as a first combined reliability parameter, or a combined reliability parameter for the left eye.

The second confidence value may for example be determined (or computed) based on one or more parameters representing respective factors indicative of (or affecting) a reliability of the gaze direction determined for the right eye. The one or more parameters may for example be computed (or determined) based on the one or more obtained images of the right eye. The second confidence value may for example be referred to as a second combined reliability parameter, or a combined reliability parameter for the right eye.

According to some embodiments, the circuitry may be configured to determine the final gaze direction based on the determined gaze direction of the left eye, the determined gaze direction of the right eye, the first confidence value, and the second confidence value.

According to some embodiments, the determination of the final gaze direction may be based at least in part on a weighted combination (or weighted sum) of the determined gaze direction of the left eye and the determined gaze direction of the right eye.

In the weighted combination, the determined gaze direction of the left eye may for example be weighted based on (or by) the first confidence value, and the determined gaze direction of the right eye may for example be weighted based on (or by) the second confidence value.

According to some embodiments, the circuitry may be configured to determine (or estimate), based on the one or more obtained images of the left eye, one or more glint positions in a predetermined region of the left eye, and to determine (or estimate), based on the one or more obtained images of the right eye, one or more glint positions in a predetermined region of the right eye.

The left and right eyes may for example be illuminated by one or more illuminators, which may for example be light sources such as one or more light emitting diodes.

The glints at the left and right eyes may for example be caused by reflection of light from one or more illuminators illuminating the eyes.

According to some embodiments, the circuitry may be configured to determine (or estimate), based on the one or more images of the left eye, a position of a pupil of the left eye and one or more glint positions at the left eye, and to determine the gaze direction of the left eye based on the one or more glint positions and the position of the pupil. The circuitry may be configured to determine (or estimate), based on the one or more images of the right eye, a position of a pupil of the right eye and one or more glint positions at the right eye, and to determine the gaze direction of the right eye based on the one or more glint positions and the position of the pupil.

According to some embodiments, the predetermined region of the left eye (and analogously for the predetermined region of the right eye) may include a first region that extends from a cornea center to an edge of a spherical region of the cornea, a second region that extends from the edge of the spherical region of the cornea to an edge of the cornea, and/or a third region that is located outside of the edge of the cornea.

The cornea of the eye is typically approximately spherical in a central region of the cornea located around the pupil, but deviates more from the spherical shape further away from the center of the cornea. The central region of the cornea may therefore be referred to as a spherical region, while the region of the cornea outside the spherical region may be referred to as a non-spherical region.

According to some embodiments, the third region may be located at the sclera.

According to some embodiments, the determination of the first confidence value may be based at least in part on a distance between a cornea center (or a pupil center) of the left eye and one or more glints at the left eye. The determination of the second confidence value may be based at least in part on a distance between a cornea center (or a pupil center) of the right eye and one or more glints at the right eye.

The cornea of the eye is typically approximately spherical in a central region around the pupil, but deviates more from the spherical shape further away from the center of the cornea and thus also from the center of the pupil. The optical properties of the eye may therefore be more difficult to model in these regions, which makes glints located far out on the cornea (or even as far out as the sclera) less reliable for computation of gaze directions.

Determining the first confidence value may for example comprise associating a first value of the distance (that is, the distance between the one or more glints and the cornea center of the left eye) with a lower reliability than a reliability associated with a second value of the distance. The first value of the distance may be higher than the second value of the distance. In other words, a gaze direction obtained using glints located far from the cornea center may be assigned (or attributed) a lower reliability than a reliability assigned to (or attributed to) gaze directions obtained using glints located closer to the cornea center. In other words, the reliability may decrease when the glint moves further away from the cornea center. It will be appreciated that other factors may also affect the overall reliability of the determined gaze directions, and that the overall reliability of a determined gaze direction may therefore increase even if the glint moves away from the cornea center.

According to some embodiments, the determination of the first confidence value may include associating glints located at a first region of the left eye with a higher reliability than a reliability associated with glints located at a second region of the left eye. The first region of the left eye may extend from a cornea center to an edge of a spherical region of the cornea. The second region of the left eye may extend from the edge of the spherical region of the cornea to an edge of the cornea. In other words, gaze directions obtained using glints located in the first region may be assigned (or attributed) higher reliability that reliability attributed to (or assigned to) gaze directions obtained using glints located in the second region. In other words, the reliability of the determined gaze direction may decrease as the glints move from the first region to the second region. It will be appreciated that other factors may also affect the overall reliability of the determined gaze direction, and that the overall reliability may therefore increase even if the glints move from the first region to the second region.

According to some embodiments, the determination of the first confidence value may include associating glints located at the second region of the left eye with a higher reliability than a reliability associated with glints located in a third region of the left eye. The third region of the left eye may be located outside of the edge of the cornea. In other words, gaze directions obtained using glints located in the second region may be assigned (or attributed) higher reliability that reliability attributed to (or assigned to) gaze directions obtained using glints located in the third region. In other words, the reliability of the determined gaze direction may decrease as the glints move from the second region to the third region. It will be appreciated that other factors may also affect the overall reliability of the determined gaze direction, and that the overall reliability could therefore increase even if the glints move from the second region to the third region.

According to some embodiments, the determination of the second confidence value may include associating glints located at a first region of the right eye with a higher reliability than a reliability associated with glints located at a second region of the right eye. The first region of the right eye may extend from a cornea center to an edge of a spherical region of the cornea. The second region of the right eye may extend from the edge of the spherical region of the cornea to an edge of the cornea. In other words, gaze directions obtained using glints located in the first region may be assigned (or attributed) higher reliability that reliability attributed to (or assigned to) gaze directions obtained using glints located in the second region. In other words, the reliability of the determined gaze direction may decrease as the glints move from the first region to the second region. It will be appreciated that other factors may also affect the overall reliability of the determined gaze direction, and that the overall reliability may therefore increase even if the glints move from the first region to the second region.

According to some embodiments, the determination of the second confidence value may include associating glints located at the second region of the right eye with a higher reliability than a reliability associated with glints located in a third region of the right eye. The third region of the right eye may be located outside of the edge of the cornea. In other words, gaze directions obtained using glints located in the second region may be assigned (or attributed) higher reliability that reliability attributed to (or assigned to) gaze directions obtained using glints located in the third region. In other words, the reliability of the determined gaze direction may decrease as the glints move from the second region to the third region. It will be appreciated that other factors may also affect the overall reliability of the determined gaze direction, and that the overall reliability could therefore increase even if the glints move from the second region to the third region.

According to some embodiments, the determination of the first confidence value may be based on a position of one or more glints at the left eye relative to a position of the pupil edge of the left eye. The determination of the second confidence value may be based on a position of one or more glints at the right eye relative to a position of the pupil edge of the right eye.

The edge of the pupil may be employed for estimating the position and the size of the pupil. If the glint is located at the edge of the pupil it will impact the pupil edge detection. Fewer detected pupil edge points will make pupil position and pupil size determination less reliable, which may affect the accuracy of the pupil center and pupil edge computation, which may affect the reliability of the determined gaze direction. If a glint is located at the edge of the pupil in a bright pupil image (where the pupil is illuminated so that it is bright in the image) the brightness of the pupil may cause the position of the glint to be incorrectly estimated, making the gaze tracking data unreliable. In this case the glint located on the pupil edge may impact the pupil edge detection at the same time as the glint position determination is degraded, both of which may affect the reliability of the determined gaze direction.

The determination of the first confidence value (and analogously the determination of the second confidence value) may for example include associating gaze directions determined based on glints overlapping the pupils edge with lower reliability than a reliability associated with gaze directions determined based on glints not overlapping the pupil edge. In other words, gaze directions obtained using glints overlapping the pupil edge may be assigned (or attributed) lower reliability than reliability attributed to (or assigned to) gaze directions obtained using glints not overlapping the pupil edge.

According to some embodiments, the circuitry may be configured to determine a pupil center of the left eye, a pupil center of the right eye, an eyeball center of the left eye and an eyeball center of the right eye.

According to some embodiments, the cornea center may be a position at the spherical region of the cornea where a virtual line extending from the eyeball center through the pupil center intersects the spherical region of the cornea.

According to some embodiments, the determination of the first confidence value may be based at least in part on a contrast between a pupil and an iris of the left eye. High pupil-iris contrast (such as much brighter pupil than iris, or much brighter iris than pupil) facilitates determination of the pupil center, the pupil position and the pupil size. If the pupil-iris contrast is too low, it may be difficult to estimate the position and size of the pupil, which may affect the reliability of the determined gaze direction.

The determination of the first confidence value may for example include associating a first level of the contrast with a lower reliability than a reliability associated with a second level of the contrast. The first level of the contrast may be lower than the second level of the contrast. In other words, gaze directions determined based on images with high contrast between pupil and iris may be assigned (or attributed) higher reliability than reliability attributed to (or assigned to) gaze directions determined using images with low contrast between pupil and iris. In other words, the reliability of the determined gaze direction may decrease as the contrast between pupil and iris decreases.

According to some embodiments, the determination of the second confidence value may be based at least in part on a contrast between a pupil and an iris of the right eye. The determination of the second confidence value may for example include associating a first level of the contrast (that is, the pupil-iris contrast for the right eye) with a lower reliability than a reliability associated with a second level of the contrast. The first level of the contrast may be lower than the second level of the contrast.

According to some embodiments, the determination of the first confidence value may be based at least in part on a first aggregation level of determined gaze positions of the left eye with respect to a predetermined position (or a reference position) at a display apparatus. Similarly, the determination of the second confidence value may be based at least in part on a second aggregation level of determined gaze positions of the right eye with respect to a predetermined position at a display apparatus.

The same display apparatus and predetermined position may for example be employed for both eyes. Alternatively, different predetermined positions and/or display apparatus may for example be employed for the left and right eyes.

It will be appreciated that the aggregation level is a measure of how close together at the display apparatus the determined gaze positions are located. The aggregation level may also be regarded as a measure of statistical variability, or the size of random errors. The aggregation level may also be regarded as a measure of precision of the gaze tracking.

High statistical variability (or large random errors) may indicate that the determined gaze direction is less reliable. Therefore, the determination of the first and second confidence values may for example comprise associating a first level of statistical variability with a lower reliability than a reliability associated with a second level of statistical variability. The first level or statistical variability may be higher than the second level of statistical variability.

The level of aggregation (or the level of statistical variability) may for example be monitored during gaze tracking, and/or may be determined during calibration of the gaze tracking system.

According to some embodiments, the determination of the first confidence value may be based at least in part on a first distance between a predetermined position at a display apparatus and an average of determined gaze positions (for example at the display apparatus) of the left eye. The determination of the second confidence value may be based at least in part on a second distance between a predetermined position at a display apparatus and an average of determined gaze positions (for example at the display apparatus) of the right eye.

The same display apparatus and predetermined position may for example be employed for both eyes. Alternatively, different predetermined positions and/or display apparatus may for example be employed for the left and right eyes.

The first and second distances between a predetermined position and an average of determined gaze positions may for example be regarded as a measure of statistical bias, or of the size of systematic errors, of the accuracy of the gaze tracking.

Large statistical bias may indicate that the determined gaze directions are less reliable. Therefore, the determination of the first and second confidence values may for example comprise associating a first level of statistical bias with a lower reliability than a reliability associated with a second level of statistical bias. The first level or statistical bias may be higher than the second level of statistical bias. In other words, gaze directions obtained when the level of statistical bias is low may be assigned (or attributed) a higher reliability than reliability assigned to (or attributed to) gaze directions obtained when the level statistical bias is high. In other words, the reliability may decrease when the level of statistical bias increases. It will be appreciated that other factors may also affect the reliability of the determined gaze direction, and that the overall reliability may therefore decrease even if the statistical bias decreases.

The first and second distances between a predetermined position and an average of determined gaze positions for the left and right eyes, respectively, may for example be monitored during gaze tracking, or may be determined during a calibration step.

According to some embodiments, the determination of the first confidence value may be based at least in part on a glint intensity at the left eye, a shape of glints at the left eye, and/or a number of glints at the left eye. Similarly, the determination of the second confidence value may be based at least in part on a glint intensity at the right eye, a shape of glints at the right eye, and/or a number of glints at the right eye.

The glints may for example be located at the corneas of the left and right eyes, respectively.

If the intensity of a glint is too high, it may result in a large white spot in an image, making it difficult to determine the position of the center of the glint, which may affect the reliability of the determined gaze direction for that eye. Glints with high intensity may for example cause pixels in the image to be saturated so that a large portion of the glint looks just as bright in the image as the center of the glint. It may also be difficult to accurately determine the position of the glint if the glint has too low intensity. Therefore, glints with too high or too low intensity may be associated with lower reliability than glints with intensity within a certain middle intensity range (the suitable range may for example depend on the image sensor or camera capturing the images).

According to some embodiments, the determination of the first confidence value may be based at least in part on an evaluation of a similarity between an expected (or a predetermined) glint shape and a shape of a glint detected at the left eye.

The determination of the first confidence value may for example include associating a first level of glint shape similarity between the shapes with a lower reliability than a reliability associated with a second level of glint shape similarity between the shapes. The first level of the glint shape similarity may be lower than the second level of the glint shape similarity. In other words, gaze directions obtained using a glint which a shape similar to an expected glint shape may be assigned (or attributed) a higher reliability than reliabilities assigned to (or attributed to) gaze directions obtained using glints with shapes less similar to the expected glint shape. In other words, the reliability may decrease when the shape of the glint deviates more from the expected glint shape. It will be appreciated that other factors may also affect the reliability of the determined gaze directions, and the overall reliability may therefore increase even if the shape of the glint deviates more from the expected glint shape.

A glint is typically caused by reflection of light from an illuminator. The shape of the glint depends on the shape of the illuminator and the geometry of the surface at which the light is reflected. Therefore, the shape of the glint may be predicted. A deviation from the expected shape may indicate that the glint is located at an area of the eye with unexpected optical properties (which may be detrimental to the reliability of the determined gaze direction) or that the glint originates from a different light source than expected. An unexpected glint shape may therefore indicate lower reliability of the determined gaze direction.

According to some embodiments, the determination of the second confidence value may be based at least in part on an evaluation of a similarity between an expected glint shape and a shape of a glint detected at the right eye.

The determination of the second confidence value may for example include associating a first level of glint shape similarity between the shapes with a lower reliability than a reliability associated with a second level of glint shape similarity between the shapes. The first level of the glint shape similarity may be lower than the second level of the glint shape similarity. In other words, gaze directions obtained using a glint which a shape similar to an expected glint shape may be assigned (or attributed) a higher reliability than reliabilities assigned to (or attributed to) gaze directions obtained using glints with shapes less similar to the expected glint shape. In other words, the reliability may decrease when the shape of the glint deviates more from the expected glint shape. It will be appreciated that other factors may also affect the reliability of the determined gaze directions, and the reliability may therefore increase even if the shape of the glint deviates more from the expected glint shape.

According to some embodiments, the determination of the first confidence value may be based at least in part on a comparison between a number of glints detected at the left eye and a predetermined (or expected) number of glints.

The determination of the first confidence value may for example include associating a situation where the detected number of glints coincides with the predetermined (or expected) number of glints with a higher reliability than a reliability associated with a situation where the detected number of glints deviates from the predetermined (or expected) number of glints. In other words, gaze directions determined using glints from an image with the predetermined number of glints may be assigned (or attributed) a higher reliability than reliabilities assigned to (or attributed to) gaze directions determined using glints from an image with a different number of glints. In other words, the reliability may be decreased when the number of glints deviates from the predetermined number of glints. It will be appreciated that other factors may also affect the reliability of the determined gaze direction, and that the overall reliability could therefore increase even if the detected number of glints deviates from the predetermined number of glints.

The reliability of the determined gaze directions may be increased by employing glints from multiple illuminators. If some of the expected glints are missing in the images, this may affect the reliability of the gaze tracking. If an unexpectedly high number of glints are present in the images, it may be more difficult to identify the correct glints to use for the gaze tracking, and the incorrect glints may occlude image data of relevance for gaze estimation. An unexpectedly high number of glints may for example be caused by other light sources in the environment and/or that a glint is about to fall off the cornea.

According to some embodiments, the determination of the second confidence value may be based at least in part on a comparison between a number of glints detected at the right eye and a predetermined (or expected) number of glints.

The determination of the second confidence value may for example include associating a situation where the detected number of glints at the right eye coincides with the predetermined (or expected) number of glints with a higher reliability than a reliability associated with a situation where the detected number of glints at the right eye deviates from the predetermined (or expected) number of glints. In other words, gaze directions determined using glints from an image with the predetermined number of glints may be assigned (or attributed) a higher reliability than reliabilities assigned to (or attributed to) gaze directions determined using glints from an image with a different number of glints. In other words, the reliability may be decreased when the number of glints deviates from the predetermined number of glints. It will be appreciated that other factors may also affect the reliability of the determined gaze direction, and that the overall reliability could therefore increase even if the detected number of glints deviates from the predetermined number of glints.

According to some embodiments, the determination of the first confidence value may be based at least in part on a parameter indicating presence of a reflection from glasses in the one or more obtained images of the left eye, and/or a parameter indicating whether a certain region of the left eye is at least partially obscured in the one or more obtained images of the left eye. Similarly, the determination of the second confidence value may be based at least in part on a parameter indicating presence of a reflection from glasses in the one or more obtained images of the right eye, and/or a parameter indicating whether a certain region of the right eye is at least partially obscured in the one or more obtained images of the right eye.

Glints and/or pupils to be used in gaze tracking may for example be drowned in reflections from glasses, whereby the reliability of the determined gaze direction may be affected. Computing the first confidence value may for example comprise associating a gaze direction determined during presence of a reflection from glasses in the left eye with a lower reliability than a reliability associated with gaze tracking data obtained without presence of such a reflection in the left eye. Analogously, computing the second confidence value may for example comprise associating a gaze direction determined during presence of a reflection from glasses in the right eye with a lower reliability than a reliability associated with gaze tracking data obtained without presence of such a reflection in the right eye.

Objects (such as eye lids or eye lashes) obscuring regions of an eye may obscure features employed in gaze tracking, such as glints and/or the pupil, whereby the reliability of the determined gaze direction may be reduced. Gaze directions determined when certain regions of an eye are obscured may therefore be associated with (or assigned) lower reliabilities than gaze directions obtained when such regions of the eye are obscured.

According to some embodiments, the determination of the first confidence value and the second confidence value may be based at least in part on a parameter, for the left eye and the right eye respectively, indicating a number of pupil edge pixels in the one or more obtained images of the eye. The pupil edge pixels may be image pixels located along (or located at) those one or more portions of the edge of the pupil which are visible in the one or more obtained images of the eye.

The edge of the pupil may be employed to estimate the position of the center of the pupil, the edge of the pupil and the pupil size. This data may be used for estimating a gaze direction and/or gaze point (or point of regard) for the eye. If the number of image pixels located along (or at) the edge of the pupil is low, the reliability of the pupil position (and thereby the gaze direction determined based on the pupil position) may be reduced.

The determination of the first confidence value and the second confidence value may for example include associating a first number of pupil edge pixels with a lower reliability than a reliability associated with a second number of pupil edge pixels. The first number of pupil edge pixels may for example be lower than the second of pupil edge pixels. In other words, a gaze direction determined based on images with a low number of pupil edge pixels may be assigned (or attributed) a lower reliability than a gaze direction determined based on images with a high number of pupil edge pixels. In other words, the reliability may increase if the number of pupil edge pixels increases. It will be appreciated that other factors may also affect the reliability of the determined gaze direction, so that the overall reliability could decrease even if the number of pupil edge pixels increases.

According to some embodiments, the circuitry may be configured, for the left eye and the right eye respectively, to determine, based on one or more images of the eye, a first glint position at the eye caused by reflection of light from a first illuminator, to predict, based on the first glint position and a spatial relationship between the first illuminator and a second illuminator, a second glint position at the eye caused by reflection of light from the second illuminator, and to determine, based on one or more images of the eye, a second glint position at the eye caused by reflection of light from the second illuminator.

The one or more or more images from which the first glint position is determined may for example be captured by a camera when the eye is illuminated by the first illuminator. The one or more or more images from which the second glint position is determined may for example be captured when the eye is illuminated by the second illuminator.

The position of the second glint at the eye may for example be predicted based on the position of the first glint at the eye and based on knowledge of a position and/or orientation of the second illuminator relative to the first illuminator, and optionally also based on knowledge of a position and/or orientation of the second illuminator relative to a camera arranged to capture the second image, a geometric model of the eye and/or an estimated position of the eye.

It will be appreciated that the fact that the position of the second glint is "predicted" based on the first glint position does not necessarily imply that the second glint appears after the first glint. The second glint may for example appear in the same image as the first glint. The second glint may for example appear in an image before or after the image in which the first glint appears.

According to some embodiments, the determination of the first confidence value and the second confidence value may be based at least in part on a difference (or distance) between the predicted second glint position and the determined second glint position.

A large difference between the predicted position and the determined position of the second glint at an eye may indicate that the gaze direction determined for that eye may be less reliable than the gaze direction determined for the other eye.

Therefore, computing the first confidence value (and similarly the second confidence value, but for the right eye instead of for the left eye) may for example comprise associating a first size of the difference between the predicted position and the determined position of the second glint at the left eye with a lower reliability than a reliability associated with a second size of the difference between the predicted position and the determined position of the second glint at the left eye. The first size of the distance may be larger than the second size of the difference. In other words, the gaze direction obtained using images where the determined and predicted positions of the second glint are close to each other may be assigned (or attributed) a higher reliability than reliabilities assigned to (or attributed to) gaze directions obtained using images where the predicted and determined positions of the second glint are further away from each other. In other words, the reliability may decrease when the distance between the predicted and determined positions of the second glint increases. It will be appreciated that other factors may also affect the reliability of the determined gaze direction, and that the overall reliability could potentially increase even if the distance between the predicted and determined positions of the second glint increases.

According to some embodiments, the determination of the first confidence value and the second confidence value may be based at least in part on a parameter indicating whether the eye is dominant over the other eye.

The parameter indicating whether an eye is dominant over the other eye may for example be computed based on how the respective eyes move and/or based on respective deviations between the points of regard for the respective eyes and a reference point when the user is prompted to look at the reference point.

According to some embodiments, the system may comprise at least one illuminator for illuminating the eyes, and one or more cameras for capturing images of the eyes.

At least one illuminator may for example be arranged coaxially with at least one camera for capturing bright pupil images. At least one illuminator may for example be arranged non-coaxially with at least one camera for capturing dark pupil images.

According to some embodiments, the determination of the first and second confidence values may be based at least in part on parameters indicating a magnitude of residual errors remaining after calibration of eye models employed for computing gaze directions for the left and right eyes, respectively.

According to some embodiments, the circuitry may be configured to perform gaze tracking for the left eye for a sequence of images, estimate distances to the left eye (for example distances to the left eye from a camera capturing the sequence of images) for the sequence of images, and estimate a noise level in the estimated distances to the left eye. The circuitry may be configured to perform gaze tracking for the right eye for a sequence of images, estimate distances to the right eye (for example distances to the right eye from a camera capturing the sequence of images) for the sequence of images, and estimate a noise level in the estimated distances to the right eye. The determination of the first and second confidence values may be based on parameters indicative of the noise levels in the estimated distances to the left and right eyes, respectively.

A high noise level in the estimated distance to an eye may indicate that the determined gaze direction for that eye is unreliable. Therefore, the computation of the confidence value for an eye (such as the left and/or right eye) may for example comprise associating a first noise level with a lower reliability than a reliability associated with a second noise level. The first noise level may be higher than the second noise level. In other words, a gaze direction obtained when the noise level in the estimated distance is high may be assigned (or attributed) a lower reliability than reliabilities assigned to (or attributed to) gaze directions obtained when the noise level in the estimated distance is low. In other words, the reliability may decrease when the noise level in the estimated distance increases. It will be appreciated that other factors may affect the reliability of the determined gaze direction of an eye, and that the overall reliability could therefore increase even if the noise level in the estimated distance increases.

According to a second aspect, there is provided a method. The method comprises obtaining one or more images of a left eye of a user and one or more images of right eye of the user. The method comprises determining a gaze direction of the left eye of the user based on at least one obtained image of the left eye, and determining a gaze direction of the right eye of the user based on at least one obtained image of the right eye. The method comprises, determining a first confidence value based on the one or more obtained images of the left eye. The first confidence value represents an indication of the reliability of the determined gaze direction of the left eye. The method comprises determining a second confidence value based on the one or more obtained images of the right eye. The second confidence value represents an indication of the reliability of the determined gaze direction of the right eye. The method comprises determining a final gaze direction based at least in part on the first confidence value and second confidence value.

The method of the second aspect may for example be performed by the system of any of the embodiments of the first aspect, or by the circuitry comprised in such systems.

Embodiments of the method according to the second aspect may for example include features corresponding to the features of any of the embodiments of the system according to the first aspect.

According to a third aspect, there is provided one or more computer-readable storage media storing computer-executable instructions that, when executed by a computing system that implements eye/gaze data processing, cause the computing system to perform a method. The method may for example be the method according to the second aspect.

Embodiments of the one or more computer-readable storage media according to the third aspect may for example include features corresponding to the features of any of the embodiments of the system according to the first aspect.

The one or more computer-readable media may for example be one or more non-transitory computer-readable media.

It is noted that embodiments of the invention relate to all possible combinations of features recited in the claims.

BRIEF DESCRIPTION OF THE DRAWINGS

Exemplifying embodiments will be described below with reference to the accompanying drawings, in which:

FIG. 3 is a cross sectional view of a part of an eye;

Figure 1:
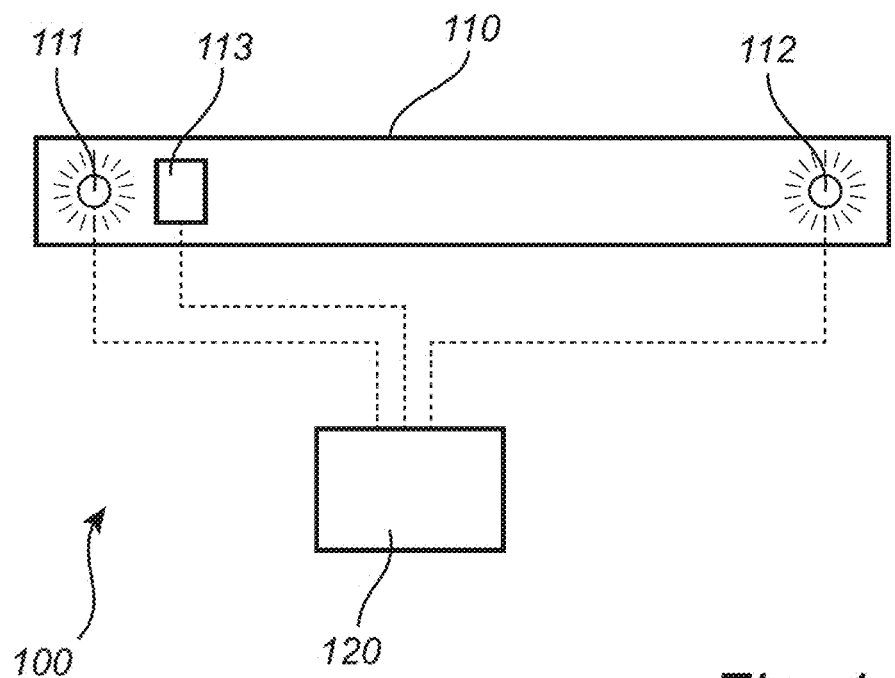
FIG. 1 shows an eye tacking system, according to an embodiment.

All the figures are schematic and generally only show parts which are necessary in order to elucidate the respective embodiments, whereas other parts may be omitted or merely suggested.

DETAILED DESCRIPTION OF THE INVENTION

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" or the like includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Eye Tracking

FIG. 1 shows an eye tacking system 100 (which may also be referred to as a gaze tracking system), according to an embodiment. The system 100 comprises illuminators 111 and 112 for illuminating the eyes of a user, and a light sensor 113 for capturing images of the eyes of the user. The illuminators 111 and 112 may for example be light emitting diodes emitting light in the infrared frequency band, or in the near infrared frequency band. The light sensor 113 may for example be a camera, such as a complementary metal oxide semiconductor (CMOS) camera or a charged coupled device (CCD) camera.

A first illuminator 111 is arranged coaxially with (or close to) the light sensor 113 so that the light sensor 113 may capture bright pupil images of the user's eyes. Due to the coaxial arrangement of the first illuminator 111 and the light sensor 113, light reflected from the retina of an eye returns back out through the pupil towards the light sensor 113, so that the pupil appears brighter than the iris surrounding it in images where the first illuminator 111 illuminates the eye. A second illuminator 112 is arranged non-coaxially with (or further away from) the light sensor 113 for capturing dark pupil images. Due to the non-coaxial arrangement of the second illuminator 112 and the light sensor 113, light reflected from the retina of an eye does not reach the light sensor 113 and the pupil appears darker than the iris surrounding it in images where the second illuminator 112 illuminates the eye. The illuminators 111 and 112 may for example take turns to illuminate the eye, so that every second image is a bright pupil image, and every second image is a dark pupil image.

The eye tracking system 100 also comprises circuitry 120 (for example including one or more processors) for processing the images captured by the light sensor 113. The circuitry 120 may for example be connected to the light sensor 113 and the illuminators 111 and 112 via a wired or a wireless connection. In another example, circuitry 120 in the form of one or more processors may be provided in one or more stacked layers below the light sensitive surface of the light sensor 113.

Figure 2:
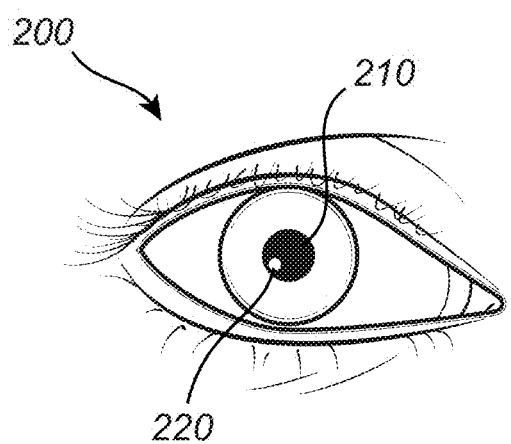
FIG. 2 shows an example image of an eye.

FIG. 2 shows an example of an image of an eye 200, captured by the light sensor 113. The circuitry 120 may for example employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and light sensors may be employed for eye tracking, and that such illuminators and light sensors may be distributed in many different ways relative to displays watched by the user. It will be appreciated that the eye tracking scheme described in the present disclosure may for example be employed for remote eye tracking (for example in a personal computer, a smart phone, or integrated in a vehicle) or for wearable eye tracking (such as in virtual reality glasses or augmented reality glasses).

Glint Position on Cornea

There is an industry trend towards larger screens. While there exist eye trackers supporting screens up to 27" (16:9), it would be desirable to support even larger screens. A problem with supporting large screens is that when the user watches a point close to the edge of the screen, glints tend to fall off the cornea so that it becomes difficult to determine the point of regard of the user (which is also referred to as the gaze point).

However, the glint on the right eye often does not fall off the cornea at the same time as the glint on the left eye. This means that even if gaze tracking data from one of the eyes is not very useful (or not very reliable), the gaze tracking data from the other eye may still be of good quality. Today, a gaze point at the screen is typically formed as a simple average of a gaze point for the left eye and a gaze point for the right eye. Therefore, the user experience is limited by the worst eye, and not by the best eye. If the position of the glint at each eye is taken into account during weighting of gaze tracking data from the left and right eye, it is possible to provide a user experience more in line with the gaze tracking data of the best eye. The gaze tracking data of the eyes may for example include gaze directions for the respective eyes and/or gaze points of the respective eyes.

FIG. 3 shows a cross section of different parts of an eye 300. The cornea 310 has a central region 311 which in general is close to spherical, and an outer region 312 which is non-spherical and therefore more difficult to model. The central region 311 (which is also referred to herein as the spherical region of the cornea 310) extends from the cornea center 313 to the edge 314 of the spherical region 314. The cornea center 313 is a position at the spherical region 311 of the cornea 310 where a virtual line 340 extending from the eyeball center 330 through the pupil center 350 intersects the spherical region 311 of the cornea 310. The outer region 312 of the cornea 310 (which is also referred to herein as the non-spherical region of the cornea 310) extends from the edge 314 of the spherical region 311 of the cornea 310 to the edge 315 of the cornea 310. FIG. 3 also shows the sclera 320 of the eye 300

In order to determine the gaze point of the eye 300 you need to find the user position in space, and this is done by using the position of the glint and the geometry of the eye. The glint is also used for determining the rotational angle of the eye. Even if the glint has not fallen off the cornea 310 completely, it might be located in the non-spherical region 312 of the cornea 310 where the shape varies much more between individuals. The shape of the non-spherical region 312 of the cornea 310 may even vary between the left and right eye of a person.

FIGS. 4a-4g show examples of where glints from an illuminator may be located at the left eye and right eye, depending on which part of the screen 420 a user 410 is looking at.

In these figures, the screen 420 is shown at the top right corner, and the user's actual gaze point (or actual point of regard) is shown by the circle 421. The dots 422 on the screen 420 represent reference points at which the user may look, for example during calibration. Each of the FIGS. 4a-4g shows the position of the glint 411 at the left eye 412 and the position of the glint 413 at the right eye 414.

Figure 4A:
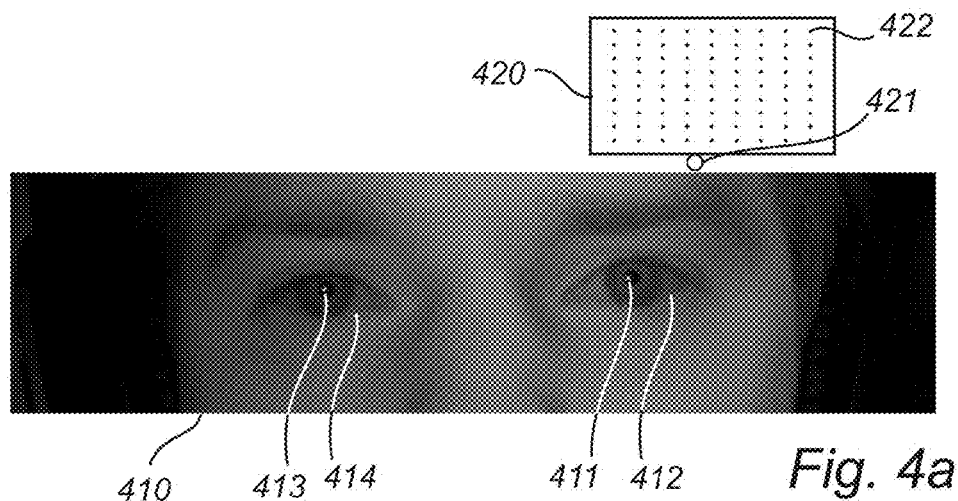
FIGS. 4a-4g show examples of where glints from an illuminator may be located at the left eye and right eye depending on where a user is looking.

In FIG. 4a, the user 410 is looking straight into the camera which is located below the screen 420. Both glints 411 and 413 are on the spherical region 311 of the cornea. The glints at both eyes therefore seem suitable for gaze tracking.

Figure 4B:
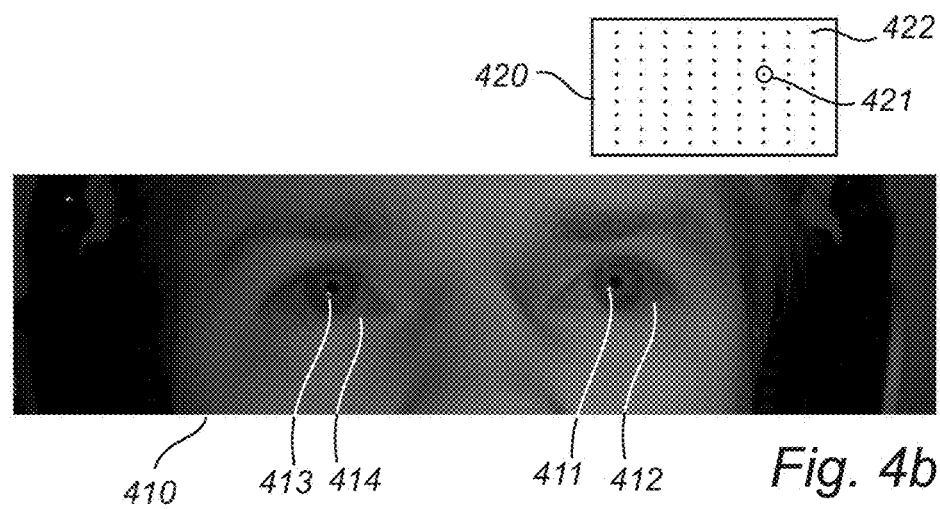

In FIG. 4b, the user's gaze point 421 has moved upwards and to the right on the screen 420. Both the left eye glint 411 and the right eye glint 413 are still in the spherical region 311 of the cornea. The glints at both eyes therefore seem well suited for gaze tracking.

Figure 4C:
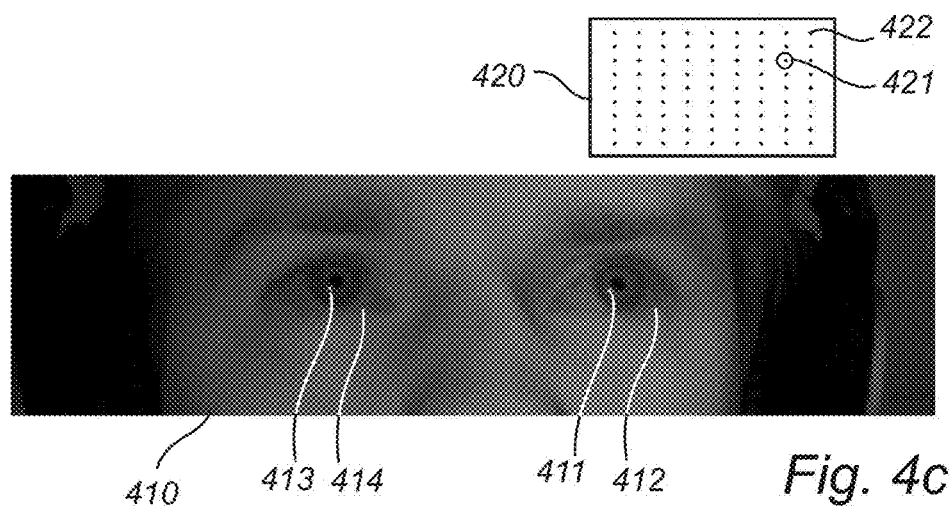

In FIG. 4c, the user's gaze point 421 has moved further upwards and to the right on the screen 420. The left eye glint 411 is now in the non-spherical region 312 of the cornea while the right eye glint 413 is still in the spherical region 311 of the cornea. Therefore, the glint 413 at the right eye seems well suited for gaze tracking while the glint 411 at the left eye would make gaze tracking less reliable.

Figure 4D:
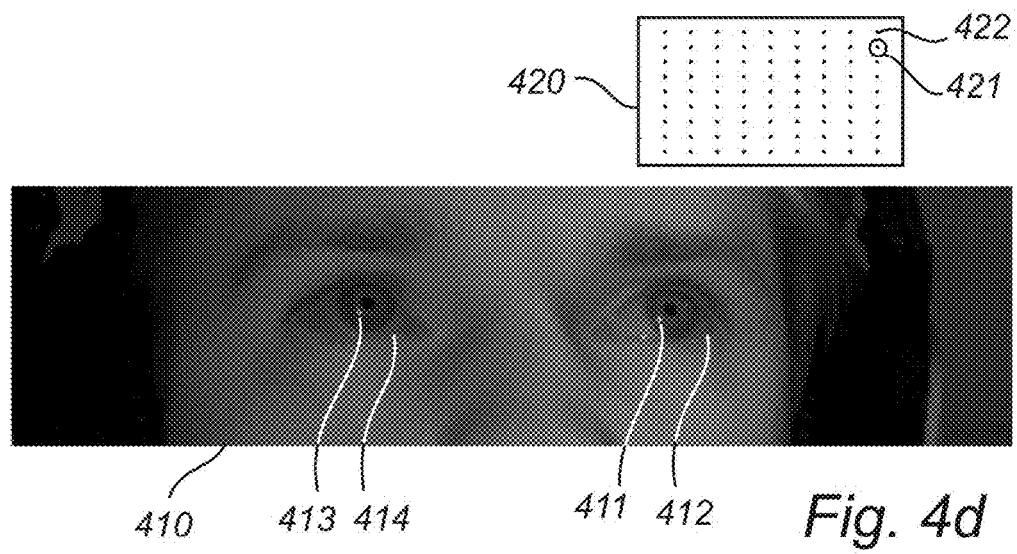

In FIG. 4d, the user's gaze point 421 has moved further upwards and to the right on the screen 420. The left eye glint 411 is in the non-spherical region 312 of the cornea while the right eye glint 413 is in the spherical region 311 of the cornea. Therefore, the glint 413 at the right eye seems well suited for gaze tracking while the glint 411 at the left eye would make gaze tracking less reliable.

Figure 4E:
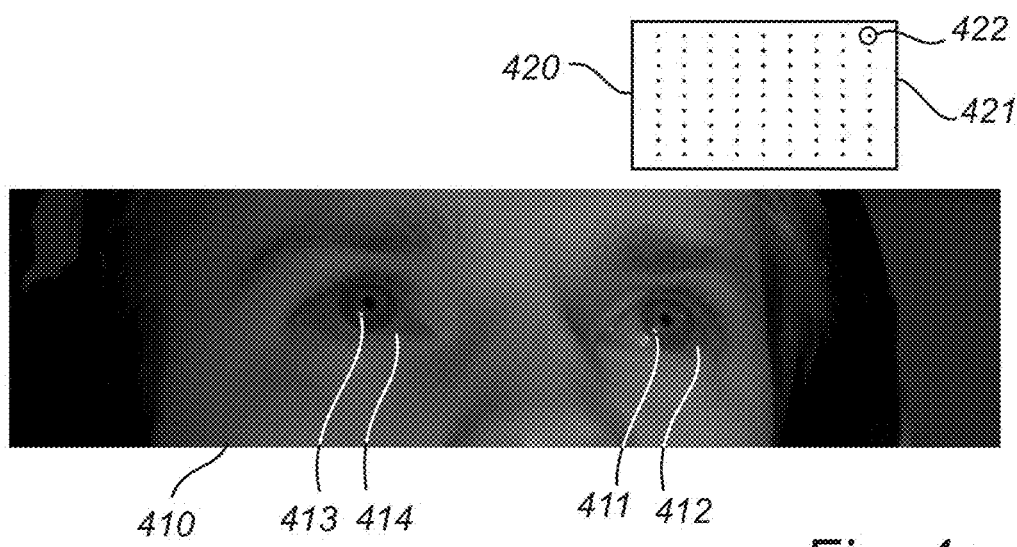

In FIG. 4e, the user's gaze point 421 has moved further upwards on the screen 420. The left eye glint 411 is close to the edge of the cornea 310 while the right eye glint 413 is in the non-spherical region 312 of the cornea. Since the left eye glint 411 is about to fall off the cornea 310, the geometry of the eye causes several glints to appear at the left eye 412 instead of only one. This makes gaze tracking based on the left eye glint 411 unreliable, while the right eye glint 413 may be somewhat better suited for gaze tracking.

Figure 4F:
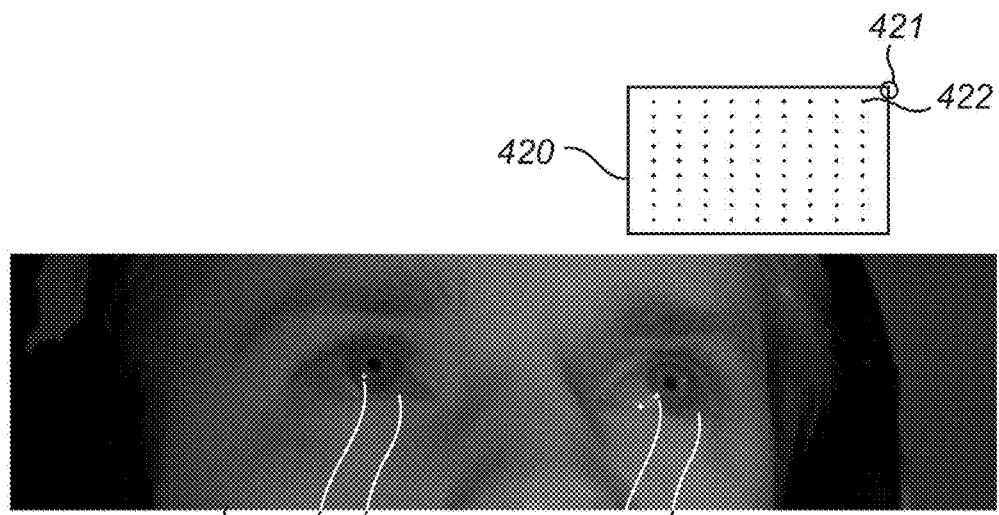

In FIG. 4f, the user's gaze point 421 has moved to the upper right corner the screen 420. The left eye glint 411 is now on the sclera 320 (which can be seen via the non-circular shape of the glint as well as the existence of an additional glint further out on the sclera) while the right eye glint 413 is in the non-spherical region 312 of the cornea.

Figure 4G:
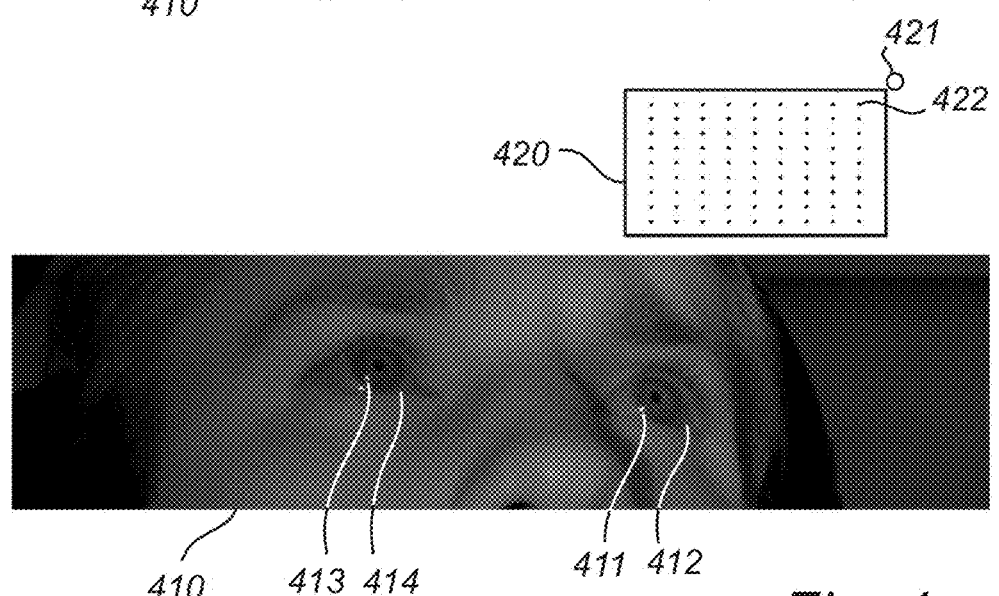

In FIG. 4g, the user's gaze point has moved even further upwards and to the right. The left eye glint 411 is on the sclera 320 while the right eye glint 413 is now on the edge of the cornea 310. Since the right eye glint 413 is about to fall off the cornea 310, the geometry of the eye causes several glints to appear at the right eye 414 instead of only one.

As described above, the position of the glints on the cornea may differ between the eyes. This is a factor which may affect the reliability of gaze tracking data (such as gaze directions) determined based on the glints on the left and right eyes, respectively, and is listed as factor A in Table 1 below. This factor A may for example be expressed as the distance between the glint and the cornea center 313. Since the spherical region 311 of the cornea 310 lies at the center of the cornea 310 close to the pupil, the position of the glint at the cornea 310 may also be expressed as the position of the glint relative to the pupil of the eye (or relative to the pupil center 350). The factor A may for example be expressed as the distance between the glint at the eye and the center 350 of the pupil of the eye.

Pupil/Iris Contrast

The contrast between the pupil and the iris depends both on the reflection of the iris and the bright pupil effect of the user. The bright pupil effect may differ significantly depending on age, ethnicity, pupil size, and eye tracker geometry, but may also differ for several other reasons. This means that the pupil/iris contrast may for example be bad at one eye all the time, or the pupil/iris contrast may be ok at both eyes but may suddenly disappear for one eye. The bright pupil effect may for example disappear for certain angles. When there is low (or no contrast) between the pupil and the iris, it may be difficult to detect the pupil, whereby the gaze direction cannot be determined correctly. If this happens for one eye, then the gaze tracking data (such as the gaze direction) for that eye should be given a lower weight (or confidence) than gaze point data for the other eye. In other words, pupil/iris contrast is a factor affecting the reliability of gaze tracking data (such as determined gaze directions) for the left and right eye, and is listed as factor B in Table 1 below.

Figure 5:
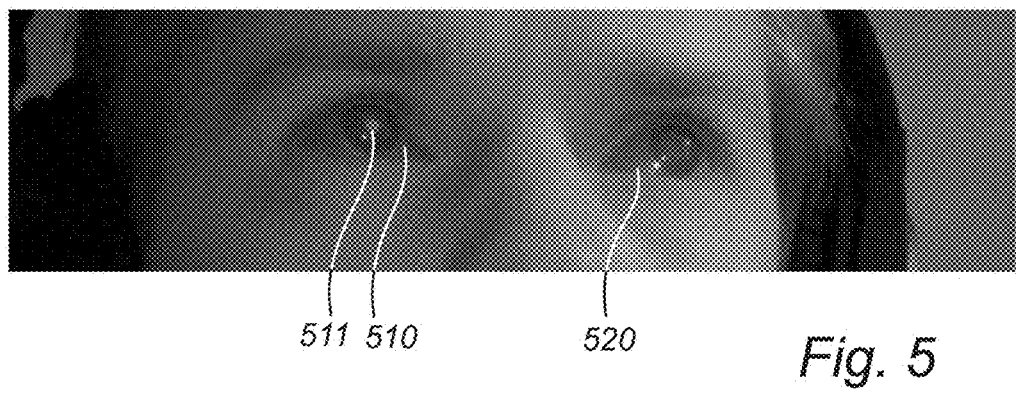
FIG. 5 shows an example of a bright pupil image.

FIG. 5 shows an example where the pupil 511 of the right eye 510 is clearly visible as a bright spot while it is more or less impossible to determine the pupil center in the left eye 520 due to the low pupil/iris contrast.

Glint Intensity

If either the pupil or the glint is determined incorrectly, the estimated gaze point on the screen may be off. Even small errors may result in a bad eye tracking experience. For the position of the glint to be determined accurately it may be important that the glint is not over saturated in the images, and that the glint does not have too low intensity. Saturation may cause the glint to appear as a large white blob in the image. The center of the glint may be difficult to estimate since saturation may cause an entire region to have the same color as the center of the glint. Possible reasons for low/high intensity glints may be eye surgery or variations in thickness of the tear film on the eye. Glint intensity is a factor affecting the reliability of gaze tracking data (such as determined gaze directions) for the left and right eye, and is listed as factor C in Table 1 below.

Glint on Pupil Edge

Figure 6:
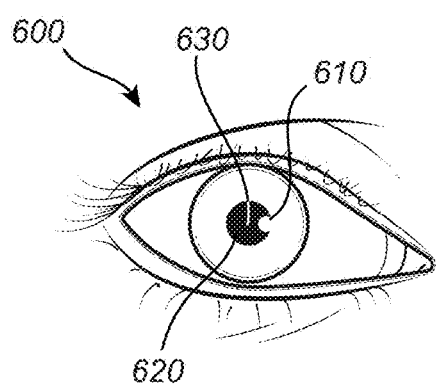
FIG. 6 shows an eye where a glint is located at the edge of the pupil.

FIG. 6 shows an eye 600 where the glint 610 from an illuminator is located at the edge 620 of the pupil 630. The glint 610 overlaps the pupil edge 620 and therefore causes a smaller part of the edge 620 to be visible in the image, making estimation of the pupil center more unreliable. The size of the glint 610 relative to the pupil 630 may be different in different situations. If the glint 610 is large relative to the pupil 630 it may cover a significant portion of the edge 620 of the pupil 630.

Moreover, in bright pupil images, calculation of the center of the glint 610 may be affected by the bright pupil 630 if the glint 610 is located at the edge 620 of the pupil 630. Calculation of the center of the glint 610 may for example be performed similarly to calculating a center of mass, but with light intensity instead of mass. The calculated glint position can therefore be "pulled" into the pupil 630, which may result in an incorrectly determined user position and/or gaze angle.

In view of the above, if one of the eyes has a glint 610 on the pupil edge 620 (or has a glint 610 overlapping the pupil edge 620), gaze tracking data from that eye should be weighted lower than gaze tracking data from the other eye, especially if the glint 610 covers a large portion of the pupil edge 620. Glint on pupil edge is a factor affecting the reliability of gaze tracking data (such as determined gaze directions) for the left and right eye, and is listed as factor D in Table 1 below.

Glasses Reflections

Wearing glasses may result in a big reflection in images of an eye. If such a reflection covers the eye in a bad way (for example covering certain regions such as the pupil), it may be difficult or even impossible to find the pupil center and/or the glint in the image. If this happens for one eye, it may be desirable to ignore gaze tracking data from that eye completely. On the other hand, a glasses reflection could in some cases cover only parts of the eye, so that the pupil and glint may still be detected, but with lower accuracy than normal. In such cases, it may be desirable to use the gaze tracking data from that eye, but with lower weight than for the other eye. Eye trackers may be designed so that the probability of both eyes having reflections from glasses at the same time is very low (for example by placing the illuminators and cameras at suitable locations). Hence, the impact of reflections from glasses may be reduced by weighting the gaze tracking data (such as the gaze directions) from the left and right eyes appropriately. Presence of a glasses reflection is a factor affecting the reliability of gaze tracking data (such as the determined gaze directions) for the left and right eyes, and is listed as factor E in Table 1 below.

Obscuring Objects

Objects such as eye lashes or eye lids may in some cases cover crucial parts of any eye, making it difficult to determine the gaze point (or gaze direction) for that eye. In such situations, it may be desirable to give gaze tracking data (such as the gaze direction) from that eye lower weight (or a lower confidence) than gaze tracking data from the other eye. In some cases where critical areas of the eye are obscured, it may even be desirable to ignore the gaze tracking data (or the gaze direction) from that eye completely, in favor of the gaze tracking data (or gaze direction) from the unobscured eye. Presence of obscuring objects is a factor affecting the reliability of gaze tracking data (such as determined gaze directions) for the left and right eyes, and is listed as factor F in Table 1 below.

Machine Learning Confidence

A black-box machine learning algorithm may be employed to generate a confidence value for each eye. Suitably designed machine learning algorithms could potentially yield appropriate confidence values if sufficient amounts of training data are made available to the algorithm. Such a confidence value may be employed as a factor indicative of the reliability of gaze tracking data (such as determined gaze directions) for the left and right eye, and is listed as factor G in Table 1 below. The machine learning algorithm(s) may for example be trained based on comparisons between determined gaze tracking data and corresponding reference points/positions where the user is actually looking.

Number of Pupil Edge Pixels

The pupil center may be computed using those parts of the pupil edge which are visible in the image. The images are typically digital images for which pixels located along (or covering) the pupil edge are employed to estimate the position of the pupil center. Determining the pupil center gets easier the more pupil edge pixels you have available in the image. Many factors may affect the number of pupil edge pixels, such as pupil size, occlusion etc. Basically, it is desirable to use images without anything occluding/obscuring the pupil, and it is desirable to have as many pupil edge pixels as possible. If one eye has less pupil edge pixels, it may therefore be desirable to give gaze tracking data (such as a determined gaze direction) for that eye lower weight (or a lower confidence) than gaze tracking data from the other eye. The number of pupil edge pixels is a factor affecting the reliability of gaze tracking data (such as determined gaze directions) for the left and right eye respectively, and is listed as factor H in Table 1 below.

Spatial Distribution of Pupil Edge Pixels

The spatial distribution of pupil edge pixels may also affect how well the pupil center position, the pupil size, and/or the pupil shape may be estimated. For example, x pupil edge pixels located only at the left half of the pupil may result in less reliable gaze tracking data (such as a less reliable gaze direction) than if x/2 pupil edge pixels were available at the left half of the pupil and x/2 pupil edge pixels were available at the right half of the pupil. In other words, the degree of spatial distribution of the pupil edge pixels in the one or more images obtained of the respective eyes is therefore a factor affecting the reliability of gaze tracking data (such as determined gaze directions) for the left and right eyes respectively, and is listed as factor Q in Table 1 below. The factor Q may also be expressed as the degree of spatial distribution of the available pupil edge pixels along the pupil edge of the eye, or as the angular distribution of the pupil edge pixels about the center of the pupil.

Calibration Quality (Residuals)

Figure 7:
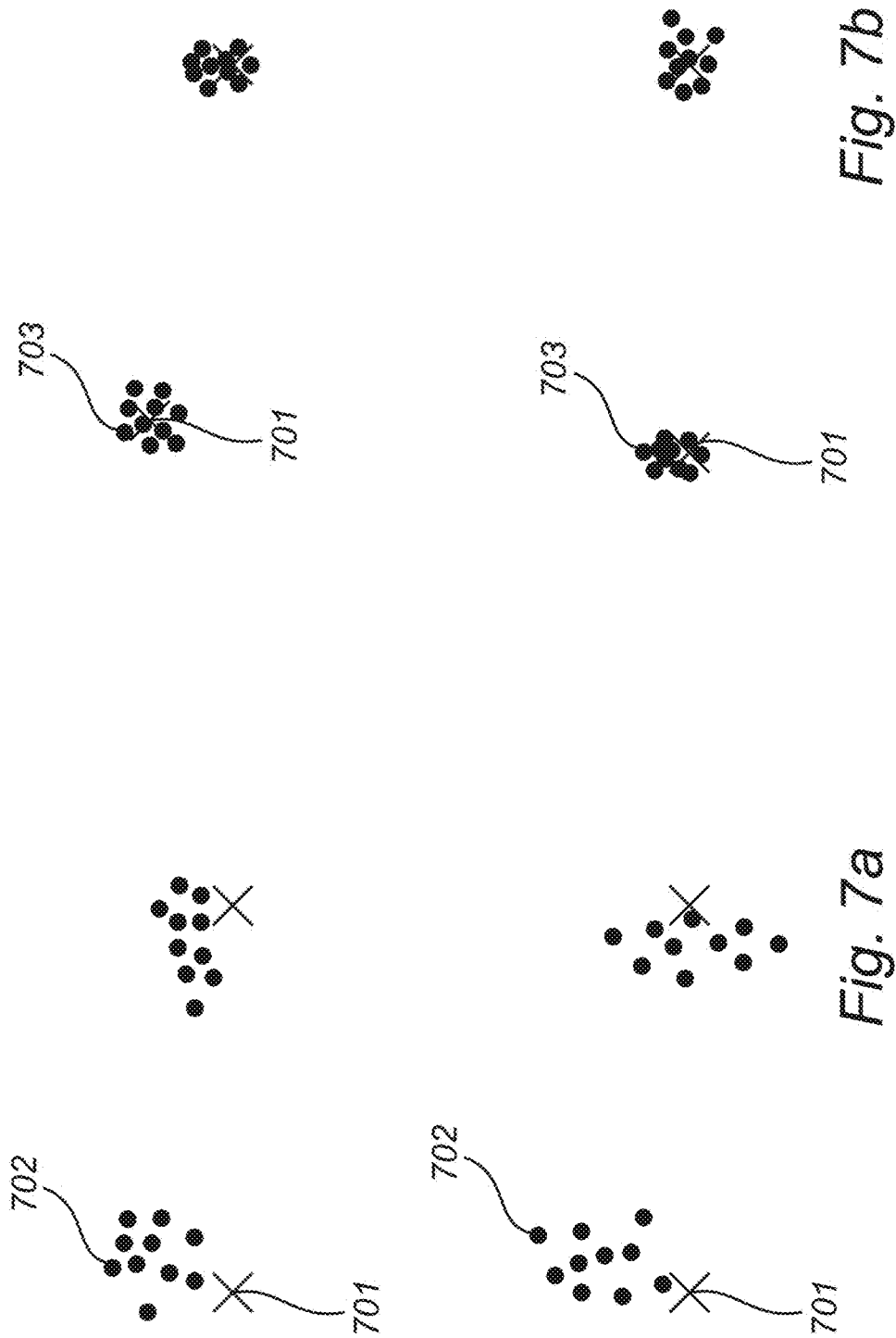
FIGS. 7a and 7b show estimated gaze points before and after calibration.

In order to provide a good eye tracking experience, a calibration is needed. FIGS. 7a-7b illustrate calibration of the eye tracker. During the calibration procedure the user looks at test points on the screen and algorithms optimize the eye model in order to minimize the error for each of these points. As illustrated in FIG. 7a, the user looks at a number of test points 701. Gaze points 702 are estimated by the eye tracker for each of the tests points 701. In the present example, ten consecutive gaze points 702 are generated for each test point 701. The eye model is then calibrated to minimize the deviations between the test points 701 and the associated estimated gaze points 702 (for example to minimize the sum of squares of the deviations). The result after calibration is shown in FIG. 7b, where the new gaze points 703 are closer to the test points 701. The remaining deviations (or errors) may be referred to as residual errors, or simply residuals. The size of the residuals may be regarded as a measure of the calibration quality. The calibration is performed for each eye, and the residuals are typically different for each eye. If the gaze data (such as the determined gaze direction) for one eye is associated with large residuals, that may indicate that the gaze tracking data for an eye is less reliable, and it may be desirable to give the gaze tracking data for that eye lower weight (or lower confidence) than for the other eye. In other words, the size of the residuals (or the calibration quality) is a factor affecting the reliability of the gaze tracking data (such as the determined gaze directions) for the left and right eye respectively, and is listed as factor I in Table 1 below.

In Table 1, the factor I is expressed as a parameter indicating a magnitude of residual errors remaining after calibration of an eye model employed for computing gaze tracking data for the eye. The residual errors may be of different types. In the example described above with reference to FIGS. 7a and 7b, the deviations between the test points 701 and the estimated gaze points 702 are minimized, and the residual error is a measure (for example the sum of squares) of the remaining deviations. Other possible quantities to use in the calibration include deviations between the actual eye position and estimated eye positions, or deviations between the actual pupil size and estimated pupil sizes. If the calibration is performed to minimize such other quantities, then the resulting residual error may for example be formed as the sum of squares of what remains of these quantities (or deviations) after the calibration.

As described above, the magnitude of the residual errors remaining after calibration for an eye (such as the left and/or right eye) may be indicative of the reliability of the gaze tracking data obtained during gaze tracking of that eye after the calibration. For example, computing a confidence value for an eye (such as the left eye and/or the right eye) may comprise associating a first magnitude of residual errors with a lower reliability than a reliability associated with a second magnitude of residual errors. The first magnitude of residual errors may be higher than the second magnitude of residual errors.

Glint Association Confidence

An eye tracker employing multiple illuminators, such as the eye tracking system 100 described above with reference to FIG. 1, may employ a glint from a first illuminator 111 to predict where a glint from a second illuminator 112 should appear. The eye tracker 100 may for example employ the first illuminator 111 to illuminate an eye (or both eyes) during a first image frame, and employ the second illuminator 112 to illuminate the eye (or both eyes) during a second image frame which is the frame after the first image frame. The image captured by the light sensor 113 at the first image frame will include a glint at the eye caused by reflection of light from the first illuminator 111. Since such a short time has passed between the first image frame and the second image frame, the user will typically not move that much between these frames. Since the position of the second illuminator 112 relative to the first illuminator 111 and the light sensor 113 is known, it is therefore possible to predict where a glint caused by reflection of light from the second illuminator 112 should appear in the image captured at the next image frame, by using the position of the glint from the first illuminator 111 in the first image frame. Such a prediction may also be based on a geometric model of the eye and an estimated position of the eye relative to the illuminators 111 and 112 and the light sensor 113.

Several glints may sometimes appear in an image, and there is a risk that the wrong glint is detected in an image, leading to errors in the estimated gaze point. The ability to predict where a glint should be located allows the eye tracker to check whether the detected glint (or the determined glint position) appears to be the correct one. In other words, the closer the detected glint is to the predicted position, the larger the chance of it being the correct glint. The difference between the predicted position and the position actually detected (or actually determined or estimated) in the image is a factor indicative of the reliability of the gaze tracking data (such as determined gaze directions) for the left and right eye respectively, and is listed as factor J in Table 1 below.

It will be appreciated that even if the correct glint has been detected, the detected position may still deviate from the predicted position. If such a deviation is large, it may indicate that something else is wrong and/or unreliable with the gaze tracking data for that eye. Gaze tracking data for the eye with a large deviation between predicted glint position and detected glint position may therefore be provided with a lower weight (of confidence) than the gaze tracking data of the other eye.

It will also be appreciated that the two illuminators 111 and 112 could for example be employed to illuminate an eye in the same image frame. The position of the glint from one of the illuminators in an image may then be employed to predict the position of the glint from the other illuminator in the same image. In other words, the "prediction" need not necessarily be performed from one image to a subsequent image. In fact, the prediction could also be performed backwards, from one image to a previous image.

Ocular Dominance

If the user has a dominant eye, gaze tracking data from that eye may be given higher weight (or higher confidence)

than gaze tracking from the other eye. The dominant eye may for example be detected by analyzing how the left and right eyes move and/or by analyzing the actual gaze points of the left and right eyes when the user looks at test points. Ocular dominance is a factor indicative of the reliability of the gaze tracking data (such as determined gaze directions) for the left and right eye respectively, and is listed as factor K in Table 1 below.

Even if the dominant eye may be detected by analyzing images captured by the eye tacker, it could also be known a priori. For example, the user could enter this information manually.

Gaze Precision (Aggregation Level)

Figure 8:
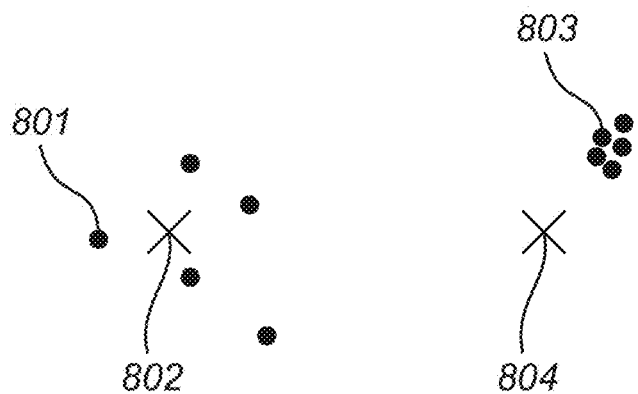
FIG. 8 shows examples of low and high statistical variability.

Precision is a measure of statistical variability, or how close together gaze points are aggregated/clustered. An example of bad precision (or high statistical variability, or large random errors) is shown to the left in FIG. 8 where the estimated gaze points 801 are distributed over a relatively large region rather than being aggregated/clustered together in a small region. An example of better precision is shown to the right in FIG. 8 where the estimated gaze points 803 are located (or aggregated/clustered) closer together. The position of the estimated gaze points 801 and 803 relative to the true gaze point of the user (indicated in FIG. 8 by 802 and 804) is irrelevant for precision.

During gaze tracking, the gaze precision for each eye (that is, the precision of the gaze direction determined for the left eye and the right eye, respectively) may be calculated continuously to monitor if there is anything in the images that makes it difficult for the algorithms to find the pupil and the glint correctly. If the precision for one eye becomes worse than for the other eye, there is probably something in the image that the algorithms cannot handle. It may therefore be desirable to apply a lower weight (or confidence) for the gaze tracking data for the eye with the bad precision than for the gaze tracking data for the other eye. Gaze precision is a factor indicative of the reliability of the gaze tracking data for the left and right eye respectively, and is listed as factor L in Table 1 below. The factor L may also be expressed as an aggregation level of determined gaze positions.

When the user is looking at a fixed point, the determined gaze direction for both eyes should be constant. During saccades (when the user moves their gaze to a new point), the determined gaze directions for both eyes should change. Changes in the determined gaze directions due to saccades could potentially be mistaken for bad gaze precision for both eyes. However, changes in the determined gaze direction for a first eye while the determined gaze direction for the second eye is constant may be an indication that the precision for the first eye is bad.

Gaze Accuracy

Figure 9:
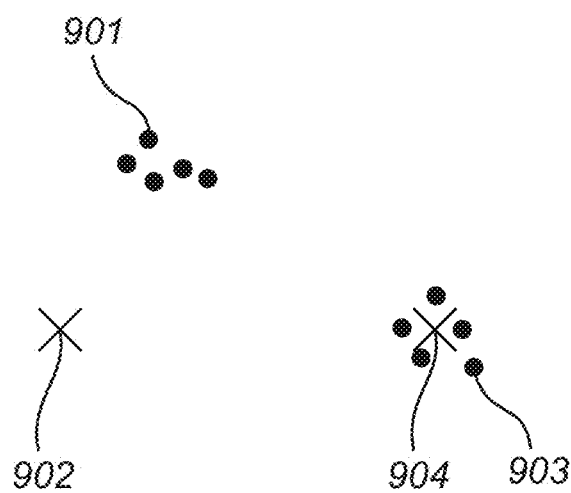
FIG. 9 shows examples of low and high statistical bias.

Accuracy is a measure of statistical bias (or systematic errors). An example of bad accuracy (or large statistical bias) is shown to the left in FIG. 9 where the estimated gaze points 901 are distributed in a region above the true gaze point 902 of the user (the average of the estimated gaze points 901 is located above the true gaze point 902). An example of better precision (or small statistical bias) is shown to the right in FIG. 9 where the estimated gaze points 903 are distributed about the true gaze point 904 of the user so that the average of the estimated gaze points 903 is located close to the true gaze point 904. If the accuracy is worse for one eye, it may be desirable to apply a lower weight (or confidence) to the gaze tracking data (or the determined gaze direction) for that eye, than to the gaze tracking data (or the determined gaze direction) of the other eye having higher accuracy. Gaze accuracy is a factor indicative of the reliability of the gaze tracking data (such as determined gaze directions) for the left and right eye respectively, and is listed as factor M in Table 1 below. The factor M in table 1 may for example be expressed as a distance between a predetermined position (such as a reference position, or a true gaze position) and an average of determined gaze positions for an eye.

The gaze accuracy may be determined continuously during gaze tracking, or during calibration.

Noise in User Distance

Glint positions may be employed for calculating the user distance. Errors in the glint position may cause the calculated user position in space to be noisy, which will cause noise also in the estimated gaze point (or gaze direction). In other words, a high noise level in the calculated user distance is an indication that the gaze tracking data is unreliable. For each eye, the user position may be calculated continuously. The noise level in the user distance calculated for each eye may be monitored during the gaze tracking. If the noise level is high for the user distance calculated for one eye, it may be desirable to apply a lower weight (or confidence) to the gaze tracking data (or determined gaze direction) for that eye than to the gaze tracking data (or determined gaze direction) from the other eye. The noise level in the calculated user distance is a factor indicative of the reliability of the gaze tracking data (such as determined gaze directions) for the left and right eye respectively, and is listed as factor N in Table 1 below.

Glint Shape

If a circularly shaped illuminator (or an illuminator which may be regarded as a point source) is employed to illuminate an eye, a reflection at the spherical portion of the cornea will typically result in a circularly shaped glint in the image. If the shape of the glint is not circular, that may be an indication that the cornea has a non-spherical structure (such as a scar) or that the glint is no longer on the cornea at all. Both these scenarios may result in poor estimation of the user position, and a bad eye tracking experience.

Optics of the light sensor (or camera), and/or the shape of the illuminator may affect the glint shape in the images. Still, the glint shape in the images may be predicted to at least some extent (for example if it is assumed that the glint is located at the spherical portion of the cornea).

A similarity between the shapes of the detected glints and the expected glint shape may be monitored for the left and right eyes. If an unexpected glint shape is detected for a first eye but not for a second eye, then it may be desirable to apply a lower weight (or confidence) to the gaze tracking data (or determined gaze direction) for the first eye than for the gaze tracking data (or determined gaze direction) for the second eye. The glint shape is a factor indicative of the reliability of the gaze tracking data (such as determined gaze directions) for the left and right eye respectively, and is listed as factor O in Table 1 below.

Number of Glints

When a large number of potential glints are found, the risk of choosing the wrong one increases. This can for example happen when there are other light sources with infrared content in the environment, or when the glint is about to fall off the cornea. An unexpectedly high number of glints may therefore be an indication that the gaze tracking data from that eye is unreliable.

In some eye trackers (for example in virtual reality eye trackers) multiple illuminators may be employed simultaneously, so that several glints intentionally appear at the eye. The reliability of the gaze tracking data may be reduced if some of the expected glints are missing in an image of the eye.

In view of the above, it may be desirable to provide a higher weight (or higher confidence) to gaze tracking data (or a determined gaze direction) from an eye where the detected number of glints matches the expected number of glints, than to gaze tracking data (or a determined gaze direction) from an eye where the detected number of glints differs from the expected number of glints. The number of detected glints is a factor indicative of the reliability of the gaze tracking data (such as the determined gaze directions) for the left and right eye respectively, and is listed as factor P in Table 1 below.

Example Embodiments

Figure 10:
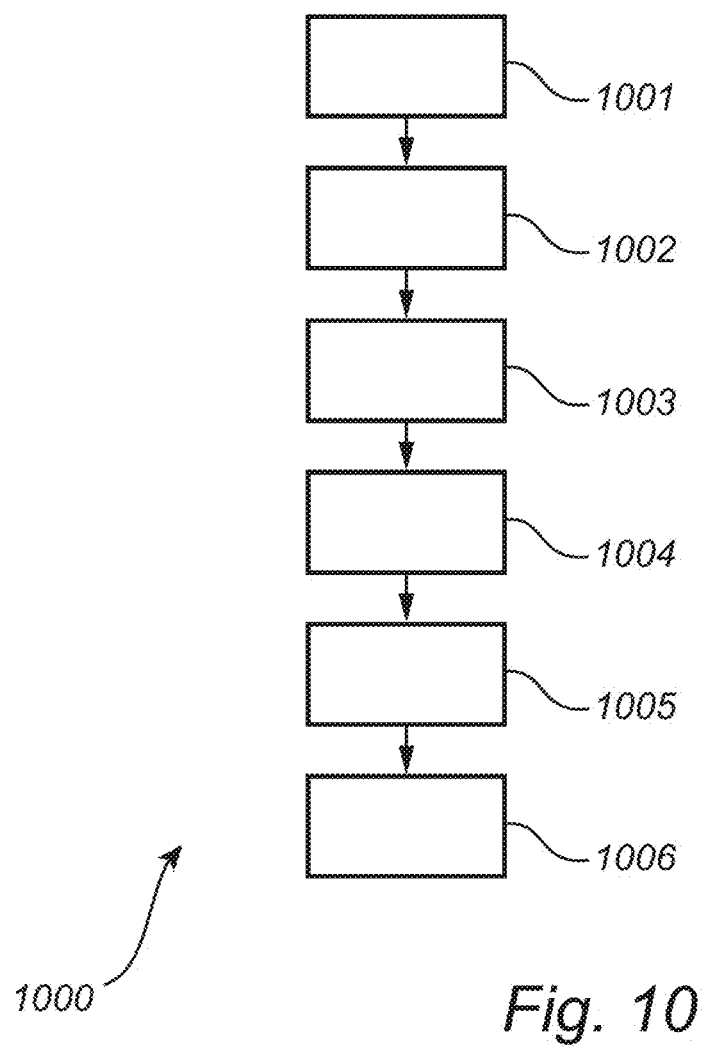
FIGS. 10-12 are flow charts of methods, according to embodiments.

FIG. 10 is a flow chart of a method 1000 which may for example be performed by the eye tracking system 100, described above with reference to FIG. 1, or the circuitry 120 of the eye/gaze tracking system 100.

The method 1000 comprises obtaining 1001 one or more images of a left eye of a user and one or more images of a right eye of the user. The images may be obtained by the image sensor 113.

The method 1000 comprises determining 1002 a gaze direction of the left eye of the user based on at least one obtained image of the left eye, and determining 1003 a gaze direction of the right eye of the user based on at least one obtained image of the right eye The method 1000 comprises determining 1004 a first confidence value based on the one or more obtained images of the left eye. The first confidence value represents an indication of the reliability of the determined gaze point of the left eye.

The method 1000 comprises determining 1005 a second confidence value based on the one or more obtained images of the right eye. The second confidence value represents an indication of the reliability of the determined gaze point of the right eye.

The method 1000 comprises determining 1006 a final (or combined) gaze direction based on the determined gaze directions for the left and right eyes, and based on the first and second confidence values. Rather than determining a final gaze direction, the step 1006 could for example determine a combined gaze point based on the determined gaze directions for the left and right eyes, and based on the first and second confidence values.

The first and second confidence values are determined (or computed) at steps 1004 and 1005 based on one or more parameters representing respective factors indicative of a reliability of the determined gaze tracking data (or gaze directions) for the left and right eyes.

The parameter(s) employed to determine the confidence values at steps 1004 and 1005 may include all of the parameters A-Q listed in Table 1 below, or may include a subset of the parameters A-Q.

TABLE 1

| Parameter label | Parameter representing a factor which is indicative of a reliability of gaze tracking data for the left and right eyes respectively |
|---|---|
| A | a position of a glint at the eye relative to a cornea of the eye; a distance between a glint at the eye and a cornea center of the eye; a position of a glint at the eye relative to a pupil of the eye; or a distance between a glint at the eye and a center of a pupil of the eye |
| B | a contrast between the pupil and the iris of the eye in the one or more images of the eye |
| C | an intensity of a glint at the eye |
| D | a position of a glint at the eye relative to an edge of a pupil of the eye |
| E | a parameter indicating presence of a reflection from glasses in the one or more images of the eye |
| F | a parameter indicating whether a certain region of the eye is at least partially obscured in the one or more images of the eye |
| G | a confidence value estimated by a machine learning algorithm based on the one or more images of the eye |
| H | a parameter indicating a number of pupil edge pixels in the one or more images of the eye, wherein the pupil edge pixels are image pixels located along those one or more portions of the edge of the pupil which are visible in the one or more images of the eye |
| I | a parameter indicating a magnitude of residual errors remaining after calibration of an eye model employed for computing gaze tracking data (such as gaze directions) for the eye |
| J | a difference between a predicted position of a glint and a determined (or detected) position of the glint |
| K | a parameter indicating whether the eye is dominant over the other eye |
| L | an aggregation level of determined gaze positions of the eye; or a parameter indicative of the precision or the gaze tracking of the eye |
| M | a distance between a predetermined position at a display apparatus and an average of determined gaze positions/points for the eye; or a parameter indicative of the accuracy of the gaze tracking for the eye |
| N | a parameter indicative of a noise level in estimated distances to the eye for a sequence of images of the eye |
| O | a shape of a glint at the eye in the one or more images of the eye |
| P | a number of glints detected in the one or more images of the eye |
| Q | a parameter indicating a degree of spatial distribution of pupil edge pixels in the one or more obtained images of the eye, wherein the pupil edge pixels are image pixels located along those one or more portions |

TABLE 1-continued

| Parameter label | Parameter representing a factor which is indicative of a reliability of gaze tracking data for the left and right eyes respectively |
|---|---|
| | of the edge of the pupil which are visible in the one or more obtained images of the eye |

The parameter(s) employed to determine the confidence values at steps 1004 and 1005 may for example include the following parameters:
- at least one of the parameters A-Q
- at least two of the parameters A-Q
- at least three of the parameters A-Q
- at least four of the parameters A-Q
- at least five of the parameters A-Q
- A and at least one more of the parameters A-Q
- B and at least one more of the parameters A-Q
- H and at least one more of the parameters A-Q
- A and B
- A and H
- A, B, and H The first and second confidence values may be computed in different ways. The confidence value for an eye (such as the left and and/or the right eye) may for example be computed as a weighted average of the different parameters computed for that eye. An explicit example will now be described. In the present example, the parameters A, B and H are employed Computation of the parameter A, relating to the position of the glint relative to the cornea, is described with reference to FIG. 3. In the present example, the value of the parameter A is assigned for the left and right eye independently of each other. The parameter A is assigned the value 1 if the glint is in the spherical region 311 of the cornea 310. If the glint is in the non-spherical region 312 of the cornea 310, the parameter A is assigned a value which decreases gradually from 1 to 0 as the glint moves closer to the edge 315 of the cornea 310. When the glint is at the sclera 320, the parameter A is assigned the value 0.

Computation of the parameter B, relating to the pupil/iris contrast may be performed as follows. In the present example, the value of the parameter B is assigned for the left and right eye independently of each other. When the pupil intensity is not more than 1.3 times the iris intensity in a bright pupil image, the value assigned for the parameter B is 0. The value assigned to the parameter B increases linearly from 0 to 1 as the pupil intensity increases to 2 times the iris intensity in a bright pupil image. The value assigned to the parameter B remains at 1 for higher contrast values. When the iris intensity is not more than 1.3 times the pupil intensity in a dark pupil image, the value assigned for the parameter B is 0. The value assigned to the parameter B increases linearly from 0 to 1 as the iris intensity grows to 2 times the pupil intensity in a dark pupil image. The value assigned to the parameter B remains at 1 for higher contrast values.

Computation of the parameter H, relating to the number of pupil edge pixels may be performed as follows. In the present example, the value of the parameter H is assigned for the left and right eye relative to each other (that is, the values of the parameter H assigned for the left and right eyes are not independent of each other). The value assigned for the left eye may be formed as the number of pupil edge pixels for the left eye divided by the number of pupil edge pixels for the right eye:

$$H_{left\ eye} = \frac{\#\ pupilEdgePixels_{left\ eye}}{\#\ pupilEdgePixels_{right\ eye}}$$

Similarly, the value assigned for the right eye may be formed as the number of pupil edge pixels for the right eye divided by the number of pupil edge pixels for the left eye:

$$H_{right\ eye} = \frac{\#\ pupilEdgePixels_{right\ eye}}{\#\ pupilEdgePixels_{left\ eye}}$$

The confidence value for the left eye may then be computed as:

$$C_{left\ eye} = \frac{A_{left\ eye} + B_{left\ eye} + H_{left\ eye}}{A_{left\ eye} + B_{left\ eye} + H_{left\ eye} + A_{right\ eye} + B_{right\ eye} + H_{right\ eye}}$$

Similarly, the confidence for the right eye may be computed as $$C_{right\ eye} = \frac{A_{right\ eye} + B_{right\ eye} + H_{right\ eye}}{A_{left\ eye} + B_{left\ eye} + H_{left\ eye} + A_{right\ eye} + B_{right\ eye} + H_{right\ eye}}$$

As can be seen in the equations above, the confidence values for the left and right eye are normalized so that the sum of the confidence values is 1. This makes the confidence values suitable as weights if a weighted average of the gaze tracking data (such as gaze directions or gaze points) for the left and right eye is to be formed.

As illustrated by the above example, the values of the parameters A-Q may for example be computed for the left and right eyes independently of each other (like the parameters A and B in the example above), or may be computed for the left and right eyes relative to each other (like the parameter H in the example above).

It will be appreciated that the example given above is merely one of many different ways to compute confidence values using parameters from Table 1 above.

The step of determining 1006 a final gaze direction, may for example include forming a weighted combination of the gaze direction for the left eye and the gaze direction for the right eye. When forming the weighted combination, the gaze directions for the respective eyes are weighted by the respective associated confidence values. In other words, the right eye gaze direction is weighted by the right eye confidence value and the left eye gaze direction is weighted by the left eye confidence value. In this way, a combined (or final) gaze direction is obtained as a weighted combination of the estimated gaze directions for the left and right eyes.

Since this weighed combination takes into account one or more of the factors A-Q for the left and right eyes, the negative impact of errors present only in the gaze tracking data (or determined gaze direction) of one eye may be more efficiently mitigated than if the left and right eye gaze tracking data (or gaze directions) were combined without taking such factors into account.

The confidence values for the left eye and the right eye determined at the steps 1004 and 1005 may for example be output by the eye tracking system 100 together with the gaze tracking data (or gaze directions) for the left and right eyes. As described below with reference to FIG. 12, a system receiving such signals may then itself determine (or compute) the combined gaze direction.

Rather than determining 1004 the first confidence value and determining 1005 the second confidence value, both based on one or more of the parameters A-Q, such parameters A-Q may instead be output by the eye tracking system 100 together with gaze tracking data (or gaze directions) for the left and right eyes. As described below with reference to FIG. 11, a system receiving such signals may then itself determine (or compute) confidence values for the left and right eyes, and then determine (or compute) the combined gaze direction.

Figures 11, 12:
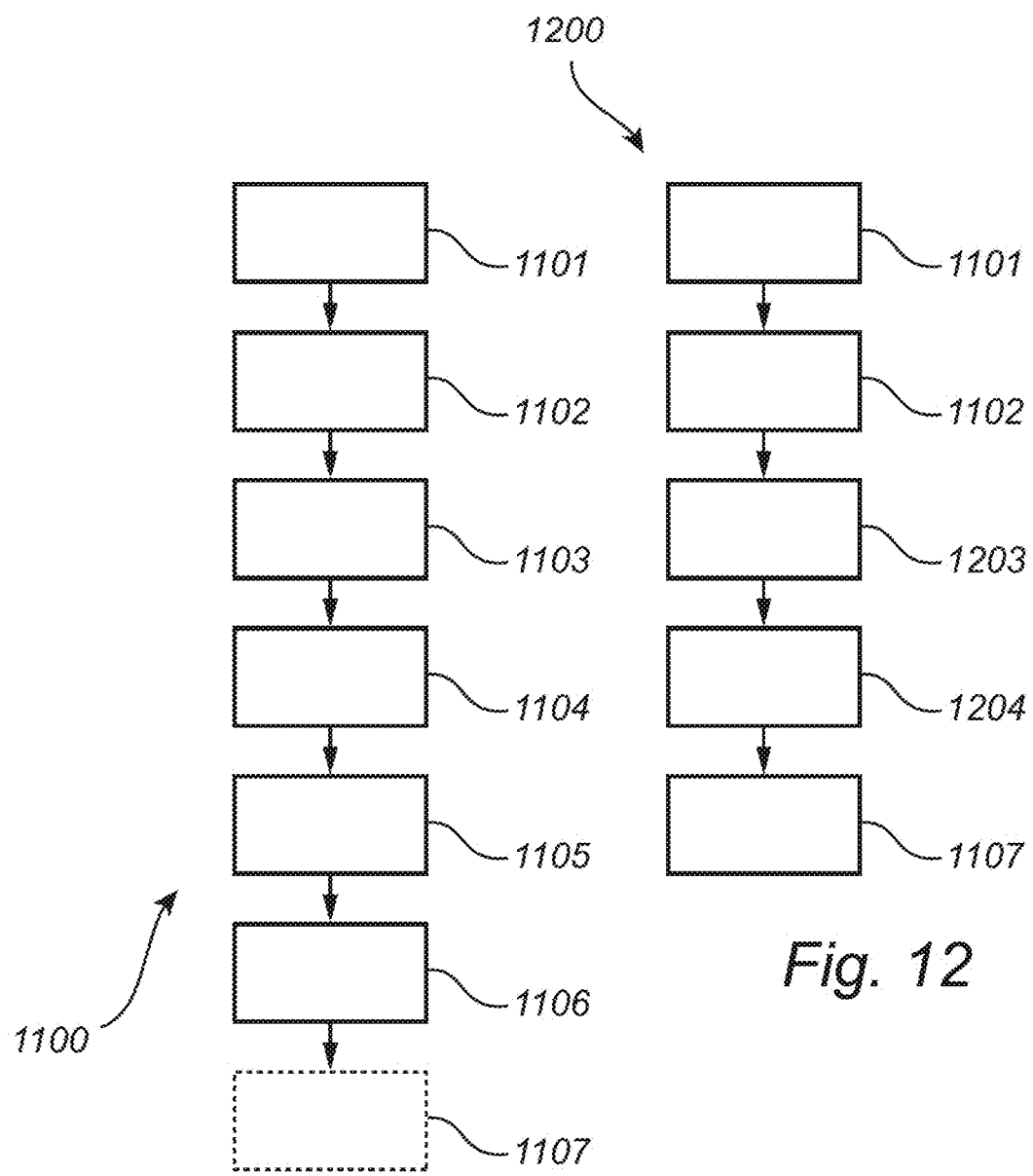

FIG. 11 is a flow chart of a method 1100 which may be performed by a system receiving data from the gaze tracking system 100 described above with reference to FIG. 1. The method 1100 may for example be performed by an operating system, or by a one or more processors.

The method 1100 comprises receiving 1101 gaze tracking data indicating a gaze direction and/or gaze point of a left eye, and receiving 1102 gaze tracking data indicating a gaze direction and/or gaze point of a right eye.

The method 1100 comprises receiving 1103 a plurality of parameters representing different factors indicative of a reliability of the gaze tracking data for the left eye, and receiving 1104 a plurality of parameters representing different factors indicative of a reliability of the gaze tracking data for the right eye. The plurality of parameters received at steps 1103 and 1104 may be any of the parameters A-Q in Table 1 above.

The method 1100 comprises computing 1105 (or determining) a combined reliability parameter (or first confidence value) for the gaze tracking data of the left eye based on at least one of the received parameters associated with the left eye, and computing 1106 a combined reliability parameter (or second confidence value) for the gaze tracking data of the right eye based on at least one of the received parameters associated with the right eye. The steps 1105 and 1106 of the method 1100 may for example be identical to the steps 1004 and 1005 of the method 1000, described above with reference to FIG. 10.

The system performing the method 1100 may for example be able to select which of the parameters received at the steps 1103 and 1104 to employ when computing the confidence values for the left and right eyes at the steps 1105 and 1106. For example, any eye tracking system 100 may provide all the parameters A-Q, but the system performing the method 1100 may select only to use a subset of these parameters, such as the parameters A, B and H, when forming the confidence values for the left and right eyes.

Optionally, the method 1100 may comprise forming 1107 (or determining) a weighted combination of the gaze tracking data (or the determined gaze directions) for the left eye and the gaze tracking data (or the determined gaze directions) for the right eye. When the weighted combination is formed, the gaze tracking data for the respective eyes are weighted based on the respective associated confidence values. The step 1107 of the method 1100 may for example be identical to the step 1006 of the method 1000 described above with reference to FIG. 10. The step 1107 may for example yield a combined gaze direction or a combined gaze point.

FIG. 12 is a flow chart of a method 1200 which may be performed by a system receiving data from the gaze tracking system 100 described above with reference to FIG. 1. The method 1200 may for example be performed by an operating system, or by a one or more processors.

Just like the method 1100 described above with reference to FIG. 11, the method 1200 comprises receiving 1101 gaze tracking data indicating a gaze direction and/or gaze point of a left eye, and receiving 1102 gaze tracking data indicating a gaze direction and/or gaze point of a right eye.

Instead of receiving parameters from Table 1 above, the method 1200 comprises receiving 1203 the confidence value (or the combined reliability parameter) for the gaze tracking data of the left eye (for example computed at the step 1004 of the method 1000), and receiving 1204 the confidence value (or the combined reliability parameter) for the gaze tracking data of the right eye (for example computed at the step 1005 of the method 1000).

Just like the method 1100 described above with reference to FIG. 11, the method 1200 comprises forming 1107 (or determining, or computing) a weighted combination of the gaze tracking data (or gaze direction) for the left eye and the gaze tracking data (or the gaze direction) for the right eye.

Miscellaneous

The person skilled in the art realizes that the present invention is by no means limited to the preferred embodiments described above. On the contrary, many modifications and variations are possible within the scope of the appended claims. For example, the person skilled in the art realizes that the eye/gaze tracking methods described herein may be performed by many other eye/gaze tracking systems than the example eye/gaze tracking system 100 shown in FIG. 1, for example using multiple illuminators and multiple cameras. It will be appreciated that any other combinations of the parameters A-Q in Table 1 than those explicitly mentioned herein may also be employed for determining confidence values (or combined reliability parameters) for the left end right eyes.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

Specialized Computer System

Figure 13:
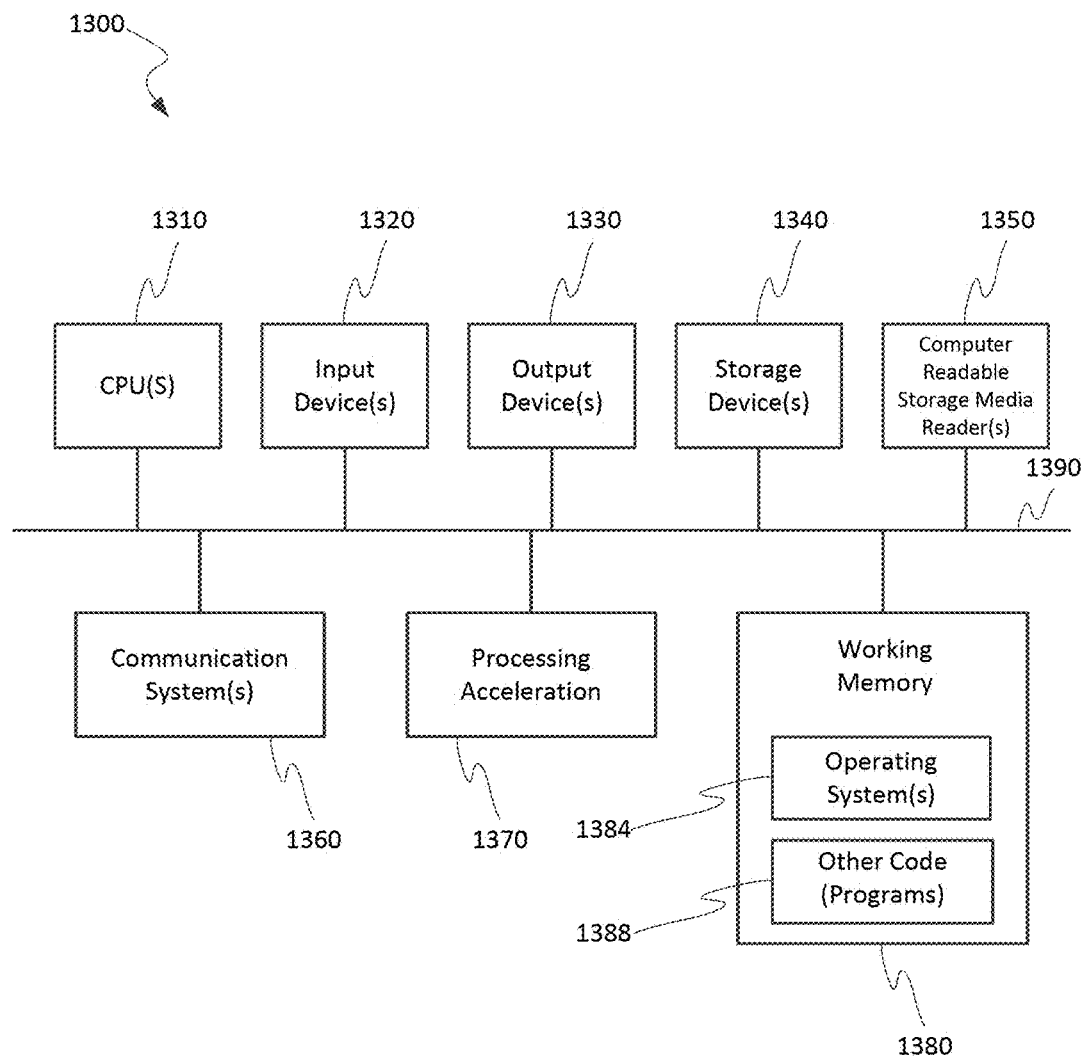
FIG. 13 is a block diagram of a specialized computer system capable of being used in at least some portion of the apparatuses or systems of the present invention, or implementing at least some portion of the methods of the present invention.

FIG. 13 is a block diagram illustrating a specialized computer system 1300 in which embodiments of the present invention may be implemented. This example illustrates specialized computer system 1300 such as may be used, in whole, in part, or with various modifications, to provide the functions of components described herein.

Specialized computer system 1300 is shown comprising hardware elements that may be electrically coupled via a bus 1390. The hardware elements may include one or more central processing units 1310, one or more input devices 1320 (e.g., a mouse, a keyboard, eye tracking device, etc.), and one or more output devices 1330 (e.g., a display device, a printer, etc.). Specialized computer system 1300 may also include one or more storage device 1340. By way of example, storage device(s) 1340 may be disk drives, optical storage devices, solid-state storage device such as a random access memory ("RAM") and/or a read-only memory ("ROM"), which can be programmable, flash-updateable and/or the like.

Specialized computer system 1300 may additionally include a computer-readable storage media reader 1350, a communications system 1360 (e.g., a modem, a network card (wireless or wired), an infra-red communication device, Bluetooth™ device, cellular communication device, etc.), and working memory 1380, which may include RAM and ROM devices as described above. In some embodiments, specialized computer system 1300 may also include a processing acceleration unit 1370, which can include a digital signal processor, a special-purpose processor and/or the like.

Computer-readable storage media reader 1350 can further be connected to a computer-readable storage medium, together (and, optionally, in combination with storage device(s) 1340) comprehensively representing remote, local, fixed, and/or removable storage devices plus storage media for temporarily and/or more permanently containing computer-readable information. Communications system 1360 may permit data to be exchanged with a network, system, computer and/or other component described above.

Specialized computer system 1300 may also comprise software elements, shown as being currently located within a working memory 1380, including an operating system 1384 and/or other code 1388. It should be appreciated that alternate embodiments of specialized computer system 1300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of specialized computer system 1300 may include code 1388 for implementing any or all of the function of the various elements of the architecture as described herein. For example, software, stored on and/or executed by a specialized computer system such as specialized computer system 1300, can provide the functions of components of the invention such as those discussed above. Methods implementable by software on some of these components have been discussed above in more detail.

List of Some Exemplary Embodiments

Embodiment 1: A method (1000) comprising: obtaining (1001) one or more images of a left eye and one or more images of a right eye; computing (1002), based on the one or more images of the left eye, gaze tracking data for the left eye indicating an estimated gaze direction of the left eye; computing (1003), based on the one or more images of the right eye, gaze tracking data for the right eye indicating an estimated gaze direction of the right eye; computing, based on the one or more images of the left eye, a plurality of parameters representing different factors indicative of a reliability of the gaze tracking data for the left eye; and computing, based on the one or more images of the right eye, a plurality of parameters representing different factors indicative of a reliability of the gaze tracking data for the right eye.

Embodiment 2: The method of embodiment 1, further comprising: computing (1004) a combined reliability parameter for the gaze tracking data for the left eye based on the plurality of parameters computed for the left eye; and computing (1005) a combined reliability parameter for the gaze tracking data for the right eye based on the plurality of parameters computed for the right eye.

Embodiment 3: The method of embodiment 2, further comprising: computing (1006) a combined gaze direction or gaze point based on the gaze tracking data for the left and right eyes and the associated combined reliability parameters.

Embodiment 4: The method of embodiment 3, wherein computing the combined gaze direction or gaze point includes: forming a weighted combination of the gaze tracking data for the left eye and the gaze tracking data for the right eye, wherein the gaze tracking data for the respective eyes are weighted based on the respective associated combined reliability parameters.

Embodiment 5: The method of any of the preceding embodiments, wherein computing the gaze tracking data for an eye (200) includes: estimating, based on the one or more images of the eye, a position of a pupil (210) of the eye and a position of a glint (220) at the eye; and computing, based on the estimated pupil position and glint position for the eye, the gaze tracking data for the eye.

Embodiment 6: The method of any of the preceding embodiments, wherein the plurality of parameters computed for an eye (300) includes: a position of a glint (220) at the eye relative to a cornea (310) of the eye; a distance between a glint (220) at the eye and a center (313) of a cornea (310) of the eye; a position of a glint (220) at the eye relative to a pupil (210) of the eye; a distance between a glint (220) at the eye and a center (350) of a pupil of the eye; and/or a position of a glint (610) at the eye relative to an edge (620) of a pupil (630) of the eye.

Embodiment 7: The method of embodiment 6, comprising: computing (1004) a combined reliability parameter for the gaze tracking data for the left eye based on the plurality of parameters computed for the left eye; and computing (1005) a combined reliability parameter for the gaze tracking data for the right eye based on the plurality of parameters computed for the right eye, wherein computing a combined reliability parameter for the gaze tracking data of an eye comprises: associating a first value of a distance between the glint at the eye and the center of the cornea of the eye with a lower reliability than a reliability associated with a second value of said distance, wherein the first value of said distance is higher than the second value of said distance; and/or associating a situation where the glint at the eye is located at the edge of the pupil of the eye with lower reliability than reliability associated with other positions of the glint relative to the pupil.

Embodiment 8: The method of any of the preceding embodiments, wherein the plurality of parameters computed for an eye 510 includes: a contrast level between a pupil 511 of the eye and an iris of the eye.

Embodiment 9: The method of embodiment 8, comprising: computing (1004) a combined reliability parameter for the gaze tracking data for the left eye based on the plurality of parameters computed for the left eye; and computing (1005) a combined reliability parameter for the gaze tracking data for the right eye based on the plurality of parameters computed for the right eye, wherein computing a combined reliability parameter for the gaze tracking data of an eye comprises: associating a first value of the contrast level with a lower reliability than a reliability associated with a second value of the contrast level, wherein the first value of the contrast level is lower than the second value of the contrast level.

Embodiment 10: The method of any of the preceding embodiments, wherein the plurality of parameters computed for an eye (200) includes: an intensity of a glint (220) employed to compute the gaze tracking data for the eye; a shape of a glint (220) employed to compute the gaze tracking data for the eye; and/or a number of glints (220) detected in the one or more images of the eye employed to obtain the gaze tracking data for the eye.

Embodiment 11: The method of embodiment 10, comprising: computing (1004) a combined reliability parameter for the gaze tracking data for the left eye based on the plurality of parameters computed for the left eye; and computing (1005) a combined reliability parameter for the gaze tracking data for the right eye based on the plurality of parameters computed for the right eye, wherein computing a combined reliability parameter for the gaze tracking data of an eye comprises: evaluating a similarity between said shape and an expected glint shape; and associating a first level of similarity between the shapes with a lower reliability than a reliability associated with a second level of similarity between the shapes, wherein the first level or similarity is lower than the second level of similarity.

Embodiment 12: The method of any of embodiments 10-11, comprising: computing (1004) a combined reliability parameter for the gaze tracking data for the left eye based on the parameters computed for the left eye; and computing (1005) a combined reliability parameter for the gaze tracking data for the right eye based on the parameters computed for the right eye, wherein computing a combined reliability parameter for the gaze tracking data of an eye comprises: comparing the number of glints detected in the one or more images of the eye employed to obtain the gaze tracking data for the eye with an expected number of glints; and associating a situation where the detected number of glints coincides with the expected number of glint with a higher reliability than a reliability associated with a situation where the detected number of glints deviates from the expected number of glints.

Embodiment 13: The method of any of the preceding embodiments, wherein the plurality of parameters computed for an eye includes: a parameter indicating presence of a reflection from glasses in the one or more images of the eye; and/or a parameter indicating whether a certain region of the eye is at least partially obscured in the one or more images of the eye.

Embodiment 14: The method of any of the preceding embodiments, wherein the plurality of parameters computed for an eye (600) includes: a parameter indicating a number of pupil edge pixels in the one or more images of the eye, wherein the pupil edge pixels are image pixels located along those one or more portions of the edge (620) of the pupil (630) which are visible in the one or more images of the eye.

Embodiment 15: The method of embodiment 14, comprising: computing (1004) a combined reliability parameter for the gaze tracking data for the left eye based on the plurality of parameters computed for the left eye; and computing (1005) a combined reliability parameter for the gaze tracking data for the right eye based on the parameters computed for the right eye, wherein computing a combined reliability parameter for the gaze tracking data of an eye comprises: associating a first number of pupil edge pixels with a lower reliability than a reliability associated with a second number of pupil edge pixels, wherein the first number of pupil edge pixels is lower than the second number of pupil edge pixels.

Embodiment 16: The method of any of the preceding embodiments, wherein the plurality of parameters computed for an eye includes: a parameter indicating a magnitude of residual errors remaining after calibration of an eye model employed for computing gaze tracking data for the eye.

Embodiment 17: The method of any of the preceding embodiments, comprising, for each of the left and right eyes: estimating, based on one or more images of the eye, a position of a first glint at the eye caused by reflection of light from a first illuminator (111); predicting, based on the position of the first glint and based on knowledge of how a second illuminator (112) is arranged relative to the first illuminator, a position of a second glint at the eye caused by reflection of light from the second illuminator; and detecting in one or more images of the eye, a position of the second glint at the eye caused by reflection of light from the second illuminator, wherein the plurality of parameters computed for an eye includes: a difference between the predicted position and the detected position of the second glint.

Embodiment 18: The method of any of the preceding embodiments, comprising: performing gaze tracking for the left eye and the right eye individually for a sequence of images; monitoring variability of gaze tracking positions estimated for the left eye; and monitoring variability of gaze tracking positions estimated for the right eye, wherein the plurality of parameters computed for an eye includes: a parameter indicative of the monitored variability of the gaze tracking positions estimated for the eye.

Embodiment 19: The method of any of the preceding embodiments, comprising: performing gaze tracking for the left eye for a sequence of images; estimating distances to the left eye for the sequence of images employed for gaze tracking for the left eye; estimating a noise level in the estimated distances to the left eye; performing gaze tracking for the right eye for a sequence of images; estimating distances to the right eye for the sequence of images employed for gaze tracking of the right eye; and estimating a noise level in the estimated distances to the right eye, wherein the plurality of parameters computed for an eye includes: a parameter indicative of the noise level in the estimated distances to the eye.

Embodiment 20: The method of any of the preceding embodiments, wherein the plurality of parameters computed for an eye includes: a parameter indicative of a distance between a reference position and an average of gaze tracking positions estimated for the eye.

Embodiment 21: The method of any of the preceding embodiments, wherein the plurality of parameters computed for an eye includes: a parameter indicating whether the eye is dominant over the other eye.

Embodiment 22: A computer program product comprising one or more computer-readable media with instructions for performing the method of any of embodiments 1-21.

Embodiment 23: A system (100) comprising: one or more processors (120) configured to perform the method of any of embodiments 1-21.

Embodiment 24: The system of embodiment 23, further comprising: one or more illuminators (111, 112) for illuminating the eyes; and one or more cameras (112) for capturing images of the eyes.

Embodiment 25: A (1100) method comprising: receiving (1101) gaze tracking data indicating a gaze direction of a left eye; receiving (1102) gaze tracking data indicating a gaze direction of a right eye; receiving (1103) a plurality of parameters representing different factors indicative of a reliability of the gaze tracking data for the left eye; receiving (1104) a plurality of parameters representing different factors indicative of a reliability of the gaze tracking data for the right eye; computing (1105) a combined reliability parameter for the gaze tracking data for the left eye based on at least one of the parameters associated with the left eye; and computing (1106) a combined reliability parameter for the gaze tracking data for the right eye based on at least one of the parameters associated with the right eye.

Embodiment 26: The method of embodiment 25, further comprising: computing (1107) a combined gaze direction or gaze point based on the gaze tracking data for the left and right eyes and the associated combined reliability parameters.

Embodiment 27: The method of embodiment 26, wherein computing the combined gaze direction or gaze point includes: forming a weighted combination of the gaze tracking data for the left eye and the gaze tracking data for the right eye, wherein the gaze tracking data for the respective eyes are weighted based on the respective associated combined reliability parameters.

Embodiment 28: The method of any of embodiments 25-27, wherein computing a combined reliability parameter for the gaze tracking data for an eye based on at least one of the received parameters associated with the eye comprises: selecting one or more of the plurality of parameters associated with the eye; and computing the combined reliability parameter for the gaze tracking data for the eye based on the selected one or more parameters.

Embodiment 29: The method of any of embodiments 25-28, wherein the plurality of parameters representing different factors indicative of a reliability of the gaze tracking data for the left eye and the right eye, respectively, include one or more of the parameters A-Q listed in Table 1.

Embodiment 30: A method (1200) comprising: receiving (1101) gaze tracking data indicating a gaze direction and/or gaze point of a left eye; receiving (1102) gaze tracking data indicating a gaze direction and/or gaze point of a right eye; receiving (1203) a combined reliability parameter for the gaze tracking data for the left eye; receiving (1204) a combined reliability parameter for the gaze tracking data for the right eye; and computing (1107) a combined gaze direction or gaze point based on the gaze tracking data for the left and right eyes and the associated combined reliability parameters.

Embodiment 31: The method of embodiment 30, wherein computing the combined gaze direction or gaze point includes: forming a weighted combination of the gaze tracking data for the left eye and the gaze tracking data for the right eye, wherein the gaze tracking data for the respective eyes are weighted based on the respective associated combined reliability parameters.

Embodiment 32: A computer program product comprising one or more computer-readable media with instructions for performing the method of any of embodiments 25-31.

Embodiment 33: A system comprising: one or more processors configured to perform the method of any of embodiments 25-31.

What is claimed is:

1. A system for determining a gaze direction of a user, wherein the system comprises:
    an eye tracking device configured to:
        capture image data relating to images of a left eye of a user;
        capture image data relating to a right eye of the user;
        determine a gaze direction of the left eye of the user based on the image data relating to the left eye;
        determine a gaze direction of the right eye of the user based on the image data relating to the right eye;
        determine a first reliability parameter based on a feature from the image data relating to the left eye, the first reliability parameter representing a reliability of the gaze direction of the left eye;
        determine a second reliability parameter based on a feature from the image data relating to the right eye, the second reliability parameter representing a reliability of the gaze direction of the right eye; and
        determine a final gaze direction based on the first reliability parameter and the second reliability parameter.

2. The system for determining a gaze direction of a user of claim 1, wherein:
    determining the final gaze direction is further based on a comparison of the gaze direction of the left eye with the gaze direction of the right eye.

3. The system for determining a gaze direction of a user of claim 2, wherein:
    determining the final gaze direction is further based on a comparison of the first reliability parameter with the second reliability parameter.

4. The system for determining a gaze direction of a user of claim 1, wherein:
    determining the first reliability parameter or determining the second reliability parameter, respectively, is further based on at least one of:
        a glint intensity at the left eye or the right eye, respectively;
        a shape of glints at the left eye or the right eye, respectively; or
        a number of glints at the left eye or the right eye, respectively.

5. The system for determining a gaze direction of a user of claim 1, wherein:
    determining the first reliability parameter or determining the second reliability parameter is further based on a head pose angle of the user.

6. The system for determining a gaze direction of a user of claim 1, wherein:
    determining the final gaze direction is further based on an eye dominance parameter which indicates whether the left eye or the right eye is dominant.

7. The system for determining a gaze direction of a user of claim 1, wherein:
- determining the first reliability parameter or determining the second reliability parameter, respectively, is further based on a number of pupil edge pixels in the image data relating to the left eye or the image data relating to the right eye, respectively, wherein a lower number of pupil edge pixels is associated with a lower reliability parameter.

8. A method for determining a gaze direction of a user, the method comprising:
- capturing image data relating to a left eye of a user;
- capturing image data relating to a right eye of the user;
- determining a gaze direction of the left eye of the user based on the image data relating to the left eye;
- determining a gaze direction of the right eye of the user based on image data relating to the right eye;
- determining a first reliability parameter based on a feature from the image data relating to the left eye, the first reliability parameter representing a reliability of the gaze direction of the left eye;
- determining a second reliability parameter based on a feature from the image data relating to the right eye, the second reliability parameter representing a reliability of the gaze direction of the right eye; and
- determining a final gaze direction based on the first reliability parameter and the second reliability parameter.

9. The method for determining a gaze direction of a user of claim 8, wherein:
- determining the final gaze direction is further based on an eye dominance parameter.

10. The method for determining a gaze direction of a user of claim 8, wherein:
- determining the first reliability parameter or the second reliability parameter, respectively, is further based on:
  - a position of a glint relative to a cornea of the left eye or the right eye, respectively;
  - a distance between the glint and a cornea center of the left eye or right eye, respectively;
  - a position of the glint relative to a pupil of the left eye or right eye, respectively;
  - a distance between the glint and a center of the pupil of the left eye or right eye, respectively;
  - an intensity of the glint detected on the left eye or the right eye respectively;
  - a contrast level between the pupil of the left eye or the right eye, and an iris of the left eye or right eye, respectively;
  - a position of the glint relative to an edge of the pupil of the left eye or the right eye, respectively;
  - a parameter indicating a number of image pixels located along an edge of the pupil of the left eye or the right eye, respectively;
  - a difference between a predicted glint position and a detected glint position on the left eye or the right eye, respectively;
  - a shape of the glint on the left eye or the right eye, respectively;
  - a number of glints detected on the left eye or the right eye, respectively; or
  - a parameter indicating a degree of spatial distribution of the image pixels located along the edge of the pupil on the left eye or the right eye, respectively.

11. The method for determining a gaze direction of a user of claim 8, wherein:
- determining the first reliability parameter or determining the second reliability parameter, respectively, is further based on:
  - an indication of a reflection in the left eye or the right eye, respectively; or
  - an indication that a region of the left eye or the right eye, respectively, is at least partially obscured.

12. The method for determining a gaze direction of a user of claim 8, wherein:
- determining the first reliability parameter or the second reliability parameter, respectively, is further based on:
  - a parameter indicating a precision of the gaze tracking of the left eye or the right eye, respectively;
  - an aggregation of gaze directions of the left eye or the right eye, respectively;
  - an indication of a magnitude of residual errors following a calibration of an eye model; or
  - a confidence value estimated by a machine learning algorithm trained based on comparing gaze direction data with known object positions.

13. The method for determining a gaze direction of a user of claim 8, wherein:
- determining the first reliability parameter or the second reliability parameter, respectively, is further based on:
- an average distance between a user and an intersection of a gaze direction with a physical object; or
- a noise level in an estimated distance from the user to an object intersected by the gaze direction.

14. The method for determining a gaze direction of a user of claim 8, wherein:
- determining a gaze direction of the left eye of the user is further based on detecting a glint in the image data relating to the left eye in response to selectively illuminating the left eye.

15. A non-transitory computer readable medium having instructions stored thereon, for determining a gaze direction of a user, executable by a computing device to cause the computing device to perform operations comprising:
- capturing image data relating to a left eye of a user
- capturing image data relating to a right eye of the user;
- determining a gaze direction of the left eye of the user based on the image data relating to the left eye;
- determining a gaze direction of the right eye of the user based on the image data relating to the right eye;
- determining a first reliability parameter based on a feature from the image data relating to the left eye, the first reliability parameter representing a reliability of the gaze direction of the left eye;
- determining a second reliability parameter based on a feature from the image data relating to the right eye, the second reliability parameter representing a reliability of the gaze direction of the right eye; and
- determining a final gaze direction based on the first reliability parameter and the second reliability parameter.

16. The non-transitory computer readable medium of claim 15, wherein:
- determining the gaze direction of the left eye is based further on detecting a glint in the image data relating to the left eye in response to selectively illuminating the left eye.

17. The non-transitory computer readable medium of claim 15, wherein:
- determining the final gaze direction is further based on an eye dominance parameter which indicates whether the left eye or the right eye is dominant.

18. The non-transitory computer readable medium of claim 15 wherein the operations further comprise:
- detecting a first glint caused by a first selective illuminator;
- predicting a location of a predicted glint caused by a second selective illuminator based on the first glint; and
- detecting a second glint caused by the second selective illuminator and wherein determining the first reliability parameter or the second reliability parameter, respectively, is based on a comparison of the predicted glint with the second glint.

19. The non-transitory computer readable medium of claim 15, wherein:
- determining the final gaze direction is further based on a comparison of the gaze direction of the left eye with the gaze direction of the right eye.

20. The non-transitory computer readable medium of claim 15, wherein:
- determining the final gaze direction is further based on a comparison of the first reliability parameter with the second reliability parameter.

\* \* \* \* \*